(12) United States Patent
Lou et al.

(10) Patent No.: US 11,395,335 B2
(45) Date of Patent: Jul. 19, 2022

(54) DATA TRANSMISSIONS AND HARQ-ACK ASSOCIATED WITH AN UNLICENSED SPECTRUM

(71) Applicant: IDAC Holdings, Inc., Wilmington, DE (US)

(72) Inventors: Hanqing Lou, Syosset, NY (US); Oghenekome Oteri, San Diego, CA (US); Xiaofei Wang, Cedar Grove, NJ (US); Ahmad Reza Hedayat, Aliso Viejo, CA (US); Alphan Sahin, Westbury, NY (US); Rui Yang, Greenlawn, NY (US); Kyle Jung-Lin Pan, Saint James, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/960,995

(22) PCT Filed: Jan. 8, 2019

(86) PCT No.: PCT/US2019/012626
§ 371 (c)(1),
(2) Date: Jul. 9, 2020

(87) PCT Pub. No.: WO2019/139876
PCT Pub. Date: Jul. 18, 2019

(65) Prior Publication Data
US 2020/0374933 A1    Nov. 26, 2020

Related U.S. Application Data

(60) Provisional application No. 62/736,544, filed on Sep. 26, 2018, provisional application No. 62/652,596, (Continued)

(51) Int. Cl.
H04W 74/08 (2009.01)
H04W 74/00 (2009.01)
(Continued)

(52) U.S. Cl.
CPC ....... *H04W 74/0808* (2013.01); *H04W 72/02* (2013.01); *H04W 74/006* (2013.01);
(Continued)

(58) Field of Classification Search
CPC .............. H04W 72/02; H04W 74/006; H04W 74/0808; H04W 74/0816; H04W 74/0833
See application file for complete search history.

(56) References Cited

U.S. PATENT DOCUMENTS

2004/0100986 A1* 5/2004 Lee ................. H04L 12/4035
370/443
2008/0002734 A1    1/2008 Zheng et al.
(Continued)

FOREIGN PATENT DOCUMENTS

WO    2016/081375 A1    5/2016
WO    2017/196086 A1    11/2017
(Continued)

OTHER PUBLICATIONS

3rd Generation Partnership Program, "Consideration on Channel Access Mechanism for Autonomous Uplink Access", 3GPP TSG RAN WG1 Meeting 90bis R1-1717329, Intel Corporation, Prague, CZ, Oct. 9-13, 2017, 4 pages.
(Continued)

*Primary Examiner* — Kevin C. Harper
(74) *Attorney, Agent, or Firm* — Condo Roccia Koptiw LLP

(57) ABSTRACT

A wireless transmit/receive unit (WTRU) may perform listen before talk (LBT) on a channel prior to uplink transmission on the channel. The WTRU may adjust an amount
(Continued)

of time that the WTRU performs LBT. For example, WTRU may receive a set of transmission opportunities. The WTRU may receive a contention window size (CWS) sequence including a CWS for each transmission opportunity. The CWS sequence may be unique and may be based on the identity of the WTRU. For a given transmission opportunity, the WTRU may select a random number between zero and the CWS for that transmission opportunity. If the channel is clear for at least an amount of time associated with the random number, the WTRU may transmit in the transmission opportunity. If the channel is not clear for at least an amount of time associated with the random number, the WTRU may not transmit in the transmission opportunity.

17 Claims, 26 Drawing Sheets

Related U.S. Application Data filed on Apr. 4, 2018, provisional application No. 62/630,506, filed on Feb. 14, 2018, provisional application No. 62/615,679, filed on Jan. 10, 2018.

(51) Int. Cl.
*H04W 72/02* (2009.01)
*H04L 5/00* (2006.01)
*H04W 16/14* (2009.01)

(52) U.S. Cl.
CPC ... *H04W 74/0816* (2013.01); *H04W 74/0833* (2013.01); *H04L 5/001* (2013.01); *H04W 16/14* (2013.01)

(56) References Cited

U.S. PATENT DOCUMENTS

| | | | |
|---|---|---|---|
| 2017/0238334 A1* | 8/2017 | Yang | H04W 74/0808 370/336 |
| 2019/0215217 A1 | 7/2019 | Kim et al. | |
| 2019/0335496 A1 | 10/2019 | Li et al. | |

FOREIGN PATENT DOCUMENTS

| | | |
|---|---|---|
| WO | 2018/062841 A1 | 4/2018 |
| WO | 2018/129725 A1 | 7/2018 |

OTHER PUBLICATIONS $3^{rd}$ Generation Partnership Program, "On AUL Channel Access", 3GPP< TSG-RAN WG1 Meeting #91, R1-1720374, Ericsson, Reno, NV, Nov. 27-Dec. 1, 2017, 8 pages.

3rd Generation Partnership Project (3GPP), Chairman's Notes, 3GPP TSG RAN WG1 Meeting #90bis, Prague, CZ, Oct. 2017.

3rd Generation Partnership Project (3GPP), RP-170828, "New SID on NR-Based Access to Unlicensed Spectrum", Qualcomm, 3GPP TSG RAN Meeting #75, Dubrovnik, Croatia, Mar. 6-9, 2017, 5 pages.

3rd Generation Partnership Project (3GPP), TS 36.213 V14.4.0, "Technical Specification Group Radio Access Network, Evolved Universal Terrestrial Radio Access (E-UTRA), Physical Layer Procedures (Release 14)", Sep. 2017, 462 pages.

3rd Generation Partnership Project (3GPP), TS 38.212 V1.0.0, "Technical Specification Group Radio Access Network, NR, Multiplexing and Channel Coding (Release 15)", Sep. 2017, pp. 1-28.

Ksentini et al., "Determinist Contention Window Algorithm for IEEE 802.11", IEEE 16th International Symposium on Personal, Indoorand Mobile Radio Communications, Sep. 11, 2005, 5 pages.

Syed et al., "Adaptive Backoff Algorithm for Contention Window for Dense IEEE 802.11 WLANs", Hindawi Publishing Corporation, Mobile Information Systems, vol. 2016, Article ID 8967281, May 1, 2016, pp. 1-11.

* cited by examiner

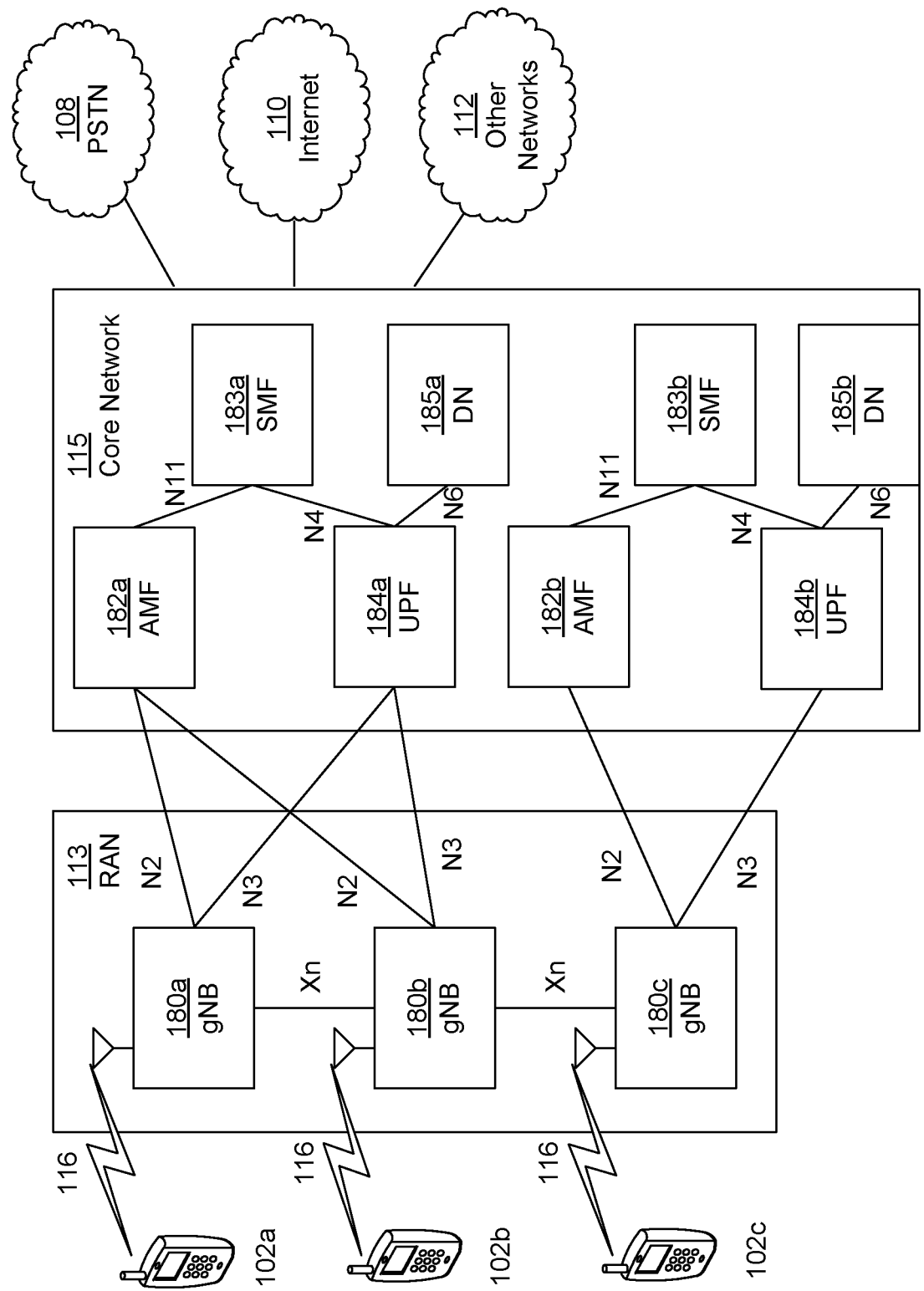

DATA TRANSMISSIONS AND HARQ-ACK ASSOCIATED WITH AN UNLICENSED SPECTRUM

CROSS-REFERENCE TO RELATED APPLICATIONS

This application is the National Stage Entry under 35 U.S.C. § 371 of Patent Cooperation Treaty Application No. PCT/US2019/012626, filed Jan. 8, 2019, which claims the benefit of U.S. Provisional Application Ser. No. 62/615,679, filed Jan. 10, 2018, U.S. Provisional Application Ser. No. 62/630,506, filed Feb. 14, 2018, U.S. Provisional Application Ser. No. 62/652,596, filed Apr. 4, 2018, and U.S. Provisional Application Ser. No. 62/736,544, filed Sep. 26, 2018, all contents of which are incorporated by reference herein.

BACKGROUND

Several deployment scenarios associated with wireless communications may be defined, e.g., indoor hotspot, dense urban, rural, urban macro, high speed, etc.

On top of these deployment scenarios, three use cases may be defined: Enhanced Mobile Broadband (eMBB), Massive Machine Type Communications (mMTC) and Ultra Reliable and Low Latency Communications (URLLC). Different use cases may focus on different requirements such as higher data rate, higher spectrum efficiency, low power and higher energy efficiency, lower latency and higher reliability.

SUMMARY

Systems, methods and instrumentalities for data transmissions and HARQ-ACK associated with an unlicensed spectrum are disclosed. A wireless transmit/receive unit (WTRU) may perform listen before talk (LBT) on a channel, for example prior to uplink transmission on the channel. The WTRU may adjust an amount of time that the WTRU performs LBT. For example, WTRU may receive a set of transmission opportunities. The WTRU may receive a contention window size (CWS) sequence including a CWS for each transmission opportunity. The CWS sequence may be unique and may be based on the identity of the WTRU. For a given transmission opportunity, the WTRU may select a random number between zero and the CWS for that transmission opportunity. If the channel is clear for at least an amount of time associated with the random number, the WTRU may transmit in the transmission opportunity. If the channel is not clear for at least an amount of time associated with the random number, the WTRU may not transmit in the transmission opportunity.

The techniques, described herein, may be associated with data transmissions (e.g., self-contained data) and HARQ-ACK transmissions. Multiple user concurrent uplink transmissions may be used. The data transmissions and HARQ-ACK may be associated with an unlicensed spectrum, which may need to be delivered accurately and on time. Self-contained data transmissions (e.g., HARQ-ACK transmissions) may be performed. A transmission may be self-contained if a transmission and an acknowledgement or non-acknowledgment of the transmission are carried in the same channel occupation time (COT). Autonomous uplink (AUL) transmissions may be performed. An AUL acknowledgement may be used. Scheduled and/or autonomous UL HARQ transmissions may be used. HARQ-ACK transmissions within COT K repetition transmissions and acknowledgement for UL configured transmissions may be used. Variable contention window sizes may be used (e.g., during K repetition transmissions for single or multiple WTRUs). Contention window size adjustment may be a function of an occasion index and/or a WTRU index. Contention window adjustment may be based on one or more of the following: a subset index, partition index, or repetition index. Variable transmit power during K repetition transmissions for single or multiple WTRUs may be used. Timing offset indication for non-standalone NRU may be used. WTRU multiplexing implementations may be provided, e.g., where more than one WTRU may share resources. Self-contained COT transmission with full duplex and/or multiple RTS/CTS exchanges may be used. Scheduled uplink (SUL) transmissions may be performed. SUL and AUL transmission may be performed in combination. HARQ transmission implementations may include a random resource selection and a confidence factor. HARQ transmissions may be transmitted based on the random resource selection. The confidence factor may measure how confident an eNB is that a device has received a transmission. Enhanced contention window size adjustment implementations may be provided for CBG based transmissions.

BRIEF DESCRIPTION OF THE DRAWINGS

FIG. 1D is a system diagram illustrating a further example RAN and a further example CN that may be used within the communications system illustrated in FIG. 1A according to an example.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
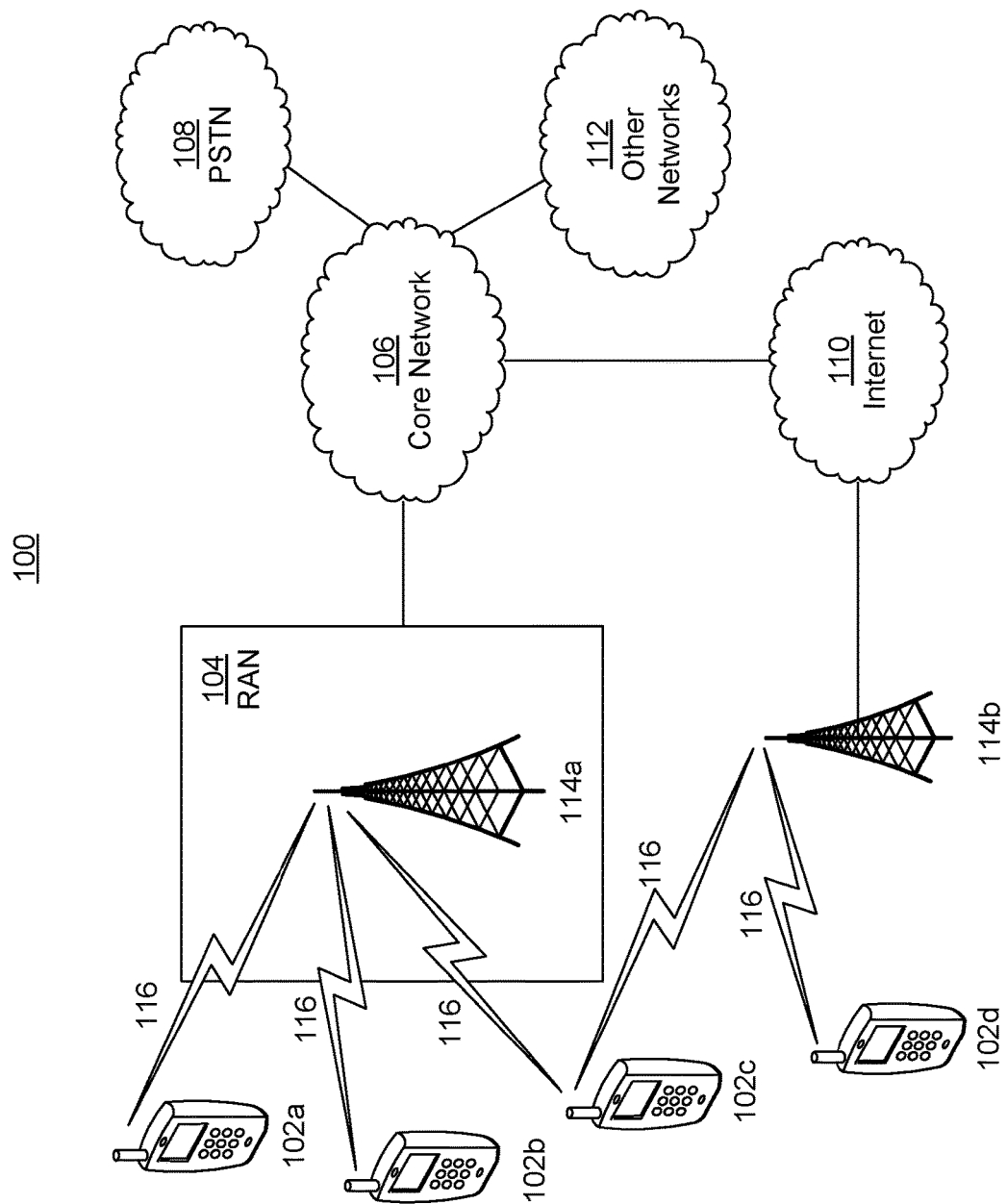
FIG. 1A is a system diagram illustrating an example communications system in which one or more disclosed examples may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA 2000, CDMA 2000 1x, CDMA 2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
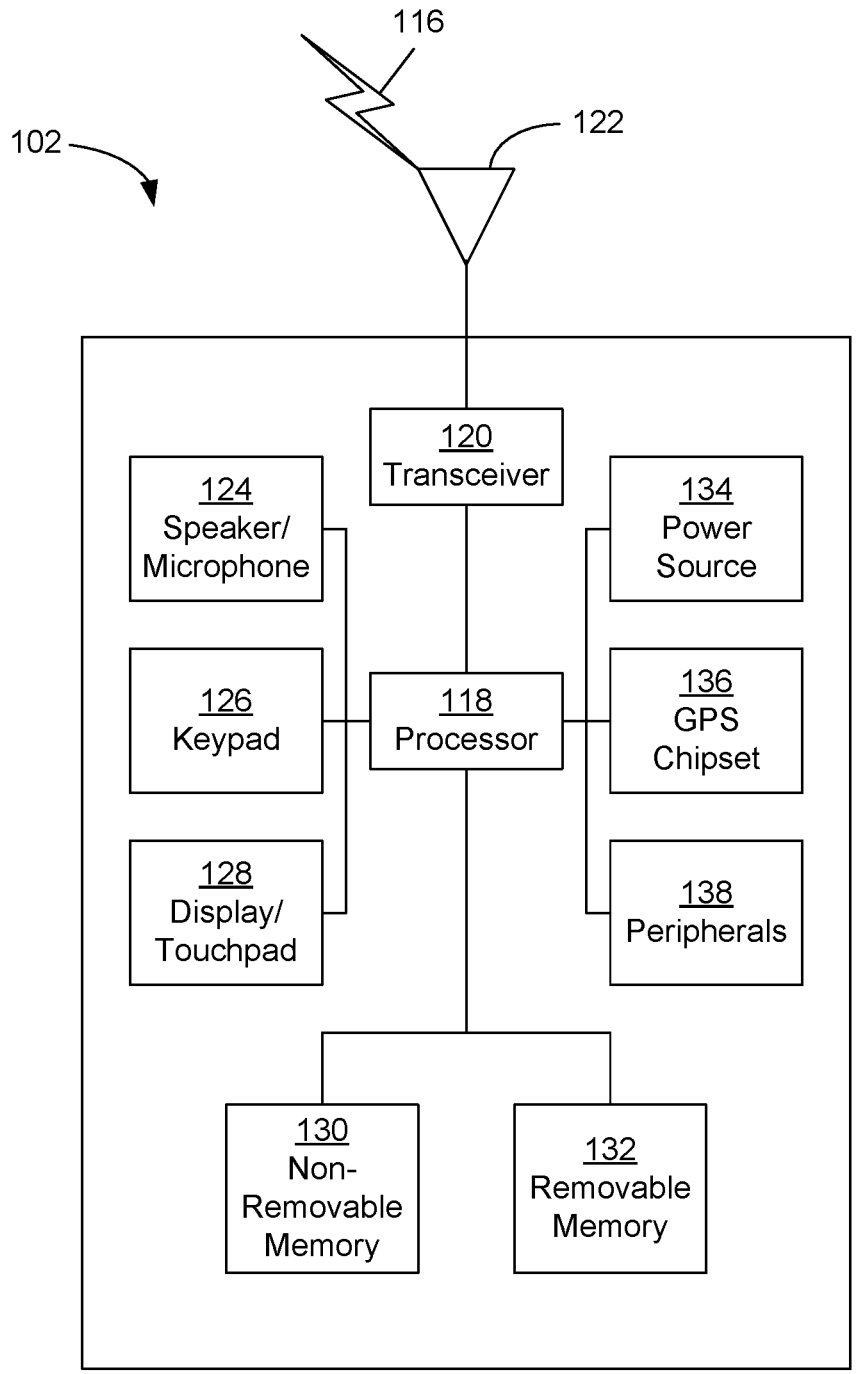
FIG. 1B is a system diagram illustrating an example wireless transmit/receive unit (WTRU) that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
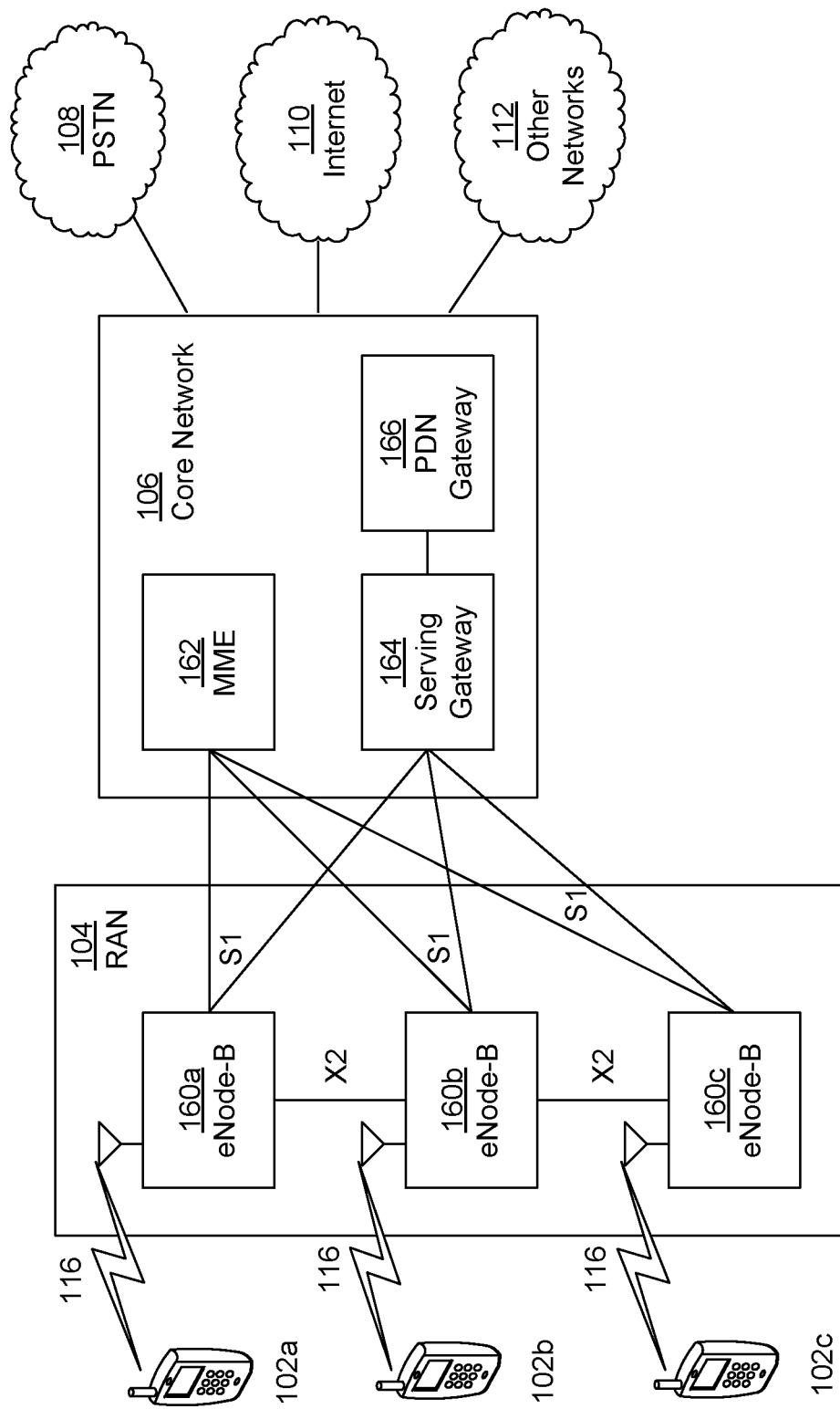
FIG. 1C is a system diagram illustrating an example radio access network (RAN) and an example core network (CN) that may be used within the communications system illustrated in FIG. 1A according to an example.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1O may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIG. 1A-D, and the corresponding description of FIG. 20 A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Self-contained data and HARQ-ACK transmissions may be used, for example to enable multiple user concurrent UL transmissions. AUL transmissions, including AUL acknowledgement, may be used. Scheduled and autonomous UL HARQ transmissions may be used. HARQ transmission may be performed, for example using random resource selection and confidence factor indication. HARQ-ACK transmissions within a COT may be used. K repetition transmissions and acknowledgment for uplink configured transmissions may be used. Variable contention window sizes and/or variable transmit power may be used during K repetition transmission for one or more WTRUs. A timing offset indication may be used for non-stand-alone NRU. Self-contained COT transmission with full duplex and multiple RTS/CTS exchanges may be used. Enhanced contention window size (CWS) adjustment may be used for K transmission occasions and/or CBG-based transmissions. WTRU multiplexing for K transmission occasions may be used.

Licensed assisted access (LAA) may use carrier aggregation technology (e.g., LTE carrier aggregation technology) to aggregate carriers (e.g., across licensed and unlicensed bands). DL LAA, enhanced LAA (eLAA) with UL transmissions, and/or further enhanced LAA (feLAA) may be used.

A listen before talk (LBT) protocol may be implemented in, e.g., in LAA. One or more of the following may apply.

LBT may be performed without random back-off. The duration of time that a channel is sensed to be idle before the transmitting entity transmits may be deterministic.

LBT may be performed with random back-off and a contention window of fixed size. LBT with random back-off and a contention window of fixed size may have one or more of the following components. The transmitting entity may draw a random number N within a contention window. The size of the contention window may be specified by the minimum and maximum value of N. The size of the contention window may be fixed. A random number N may be used in LBT to determine the duration of time that the channel is sensed to be idle before the transmitting entity transmits on the channel.

LBT may be performed with random back-off and a contention window of variable size. LBT with random back-off and a contention window of variable size may have one or more of the following components. The transmitting entity may draw a random number N within a contention window. The size of contention window may be specified by the minimum and maximum value of N. The transmitting entity may vary the size of the contention window when drawing the random number N. The random number N may be used in LBT to determine the duration of time that the channel is sensed to be idle before the transmitting entity transmits on the channel.

Four channel access priority classes and corresponding parameters may be defined in Table 1 (e.g., for a device performing random back-off). p may be the priority class index. The defer duration $T_d$ may consist of duration $T_f$=16 us followed (e.g., immediately) by $m_p$ consecutive slot durations where each slot duration may be $T_{sl}$=9 us. $CW_{minp}$ and $CW_{max,p}$ may define the minimum and maximum size of the contention window. The eNB may not continuously transmit on a carrier on which the LAA Scell(s) transmission (s) are performed (e.g., for a period exceeding $T_{mcotp}$).

TABLE 1

Channel Access Priority Class

| Channel Access Priority Class (p) | $m_p$ | $CW_{minp}$ | $CW_{max,p}$ | $T_{mcotp}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Uplink transmission in LAA may be used. Multi-subframe scheduling with adaptive grant delay may be used in eLAA (e.g., to improve UL transmission efficiency). Multiple subframes may be scheduled via a single grant (e.g., in one DL subframe). A flexible time offset may be used between a grant and the start of a corresponding UL burst. Types of UL channel access for uplink transmissions that may be used include: (i) type 1, a WTRU may transmit after sensing the channel for a fixed duration followed by a random backoff; and (ii) type 2, a WTRU may transmit after sensing the channel for 25 us.

Shared COT transmissions may be used. An eNB may acquire the channel by Category 4 LBT (e.g., acquire the channel by LBT with random back-off and a contention window of variable size), and may share the channel with WTRUs for UL transmissions. Type 1 UL channel access may be performed after LBT with random backoff. Type 2 UL channel access may be used prior to the UL transmission. Type 2 UL channel access may take place within 25 us after receiving DL data. Self-contained TXOP may be used. For example, a two stage TXOP may be used. The first stage may be a preparation stage for channel contention and/or reservation and the second stage may be used for data transmission.

A network entity (e.g., an eNodeB or an eNB) may allow autonomous uplink transmission (AUL) within the eNodeB-acquired shared COT (e.g., in subframes belonging to the UL subframes indicated with C-PDCCH, e.g., if the COT is acquired using the largest priority class value). As used herein, the terms network entity, eNB, and eNodeB may be interchangeable.

Enabling or disabling of AUL transmissions within an eNB-shared COT may be indicated (e.g., via a 1-bit field in C-PDCCH).

A WTRU may send data (e.g., for AUL transmissions) corresponding to any priority class during the UL subframes indicated with C-PDCCH (e.g., if the eNB indicates sharing is allowed).

A WTRU may not transmit AUL during the UL subframes indicated with C-PDCCH (e.g., if the eNB indicates sharing is disabled). UL subframes indicated with C-PDCCH within a single eNodeB-acquired shared COT may be contiguous. AUL transmissions of a WTRU within the shared COT may be contiguous. Autonomous Uplink in FeLAA may use Type 2 UL channel access (e.g., 25 us LBT). An AUL transmission started within the subframes belonging to the UL subframes indicated with C-PDCCH may not continue beyond the last indicated UL subframe. DL-UL-DL switch may not be allowed within a single COT. Subframes (e.g., both scheduled and AUL) belonging to the UL subframes indicated with C-PDCCH may be counted towards eNodeB COT (e.g., irrespective of whether an UL transmission occurs). AUL transmissions within an eNB shared COT may be disabled via the indication in C-PDCCH (e.g., when there is no PDSCH transmission in the COT).

Short gaps (e.g., up to 2 symbols) between subframes may be used (e.g., similarly as in (e)LAA).

A COT acquired by a WTRU using LBT with random back-off and a contention window of variable size for AUL transmission may be shared with an eNB.

An eNB may send, (e.g., to utilize the COT acquired by the WTRU), DL control information, including AUL-DFI or UL grant, to a WTRU (e.g., which acquired the COT within remaining COT).

DL transmission may be limited to a partial ending subframe of up to 2 OFDM symbol (OS) length (e.g., for DL transmission within the WTRU acquired COT).

The eNB may send control information to a (e.g., any) WTRU.

The last symbol of an AUL burst may be dropped. The eNB may use technology that is the same or similar to LBT for a discovery reference signal (DRS).

UL-DL-UL sharing may not be allowed.

Autonomous UL transmissions and/or contention windows may be used (e.g., feLAA).

A WTRU may adjust a contention window size (CWS), (e.g., before a WTRU starts to transmit an AUL burst), according to one or more of the following conditions. For example, if there is at least one previous LBT with random back-off and a contention window of variable size UL transmission, from the start subframe of which N or more subframes have elapsed and neither UL grant nor AUL Downlink Feedback Information is received (e.g., where N=max (X, corresponding UL burst length+1) if X>0 and N=0 if X≤0), the WTRU may adjust the CWS. X may be a RRC configured value, where X may be equal to 0 or 5 subframes if the absence of other technologies on the same carrier cannot be guaranteed, or X may be equal to 0 or 10 subframes if the absence of other technologies on the same carrier can be guaranteed. For (e.g., each) a previous LBT with random back-off and a contention window of variable size (SUL/AUL) transmission from the start subframe of which N or more subframes have elapsed and neither UL grant nor AUL Downlink Feedback Information is received, the contention window size (e.g., of all priority classes) at the WTRU may be increased (e.g., to the next higher value) and/or a previous (e.g., each previous) LBT with random back-off and a contention window of variable size transmission may be used to adjust the CWS (e.g., only once). If the WTRU starts a (e.g., new) LBT with random back-off and a contention window of variable size, the CWS may be unchanged (e.g., if the WTRU starts an LBT UL transmission before N subframes have elapsed from the previous LBT with random back-off and a contention window of variable size and neither UL grant nor AUL Downlink Feedback Information is received). The WTRU may recompute the CWS (e.g., if the WTRU receives feedback for one or more previous with random back-off and a contention window of variable size LBT (SUL/AUL) transmissions from the start subframe of which N or more subframes have elapsed and neither UL grant nor AUL Downlink Feedback Information was received). The WTRU may recompute the CWS by reverting the CWS to the value used to transmit the first burst of the previous LBT with random back-off and a contention window of variable size transmission(s). The WTRU may recompute the CWS by updating the CWS sequentially in order of the transmission of bursts. For example, if the feedback indicates ACK for the first subframe of the burst, the CWS may be reset. For example, if the feedback indicates NACK or there is no feedback for the first subframe of the burst, the CWS may be doubled. The WTRU may draw a new random backoff counter and apply the counter to an ongoing LBT procedure (e.g., if the WTRU contention window size changes while LBT with random back-off and a contention window of variable size is ongoing).

Although features and elements may be described in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Self-contained control and data transmissions may be used. Transmission in unlicensed band may perform LBT (e.g., due to regulations). Guaranteed transmissions may not be performed (e.g., even if the transmission is scheduled). Some transmissions, such as HARQ-ACK may need to be delivered accurately and in time (e.g., without going through another media contention process). Other information, such as higher layer configurations and settings may need to (e.g., may also need to) be set before or together with data transmission. Implementations may be needed to perform a self-contained transmission which may include data transmission, HARQ-ACK transmission, higher layer configurations and settings, and/or other control information (e.g., needed to help the data transmission). Construction of a HARQ-ACK transmission may be specified.

Autonomous UL (AUL) transmissions may be performed. Autonomous uplink transmissions may be used in an unlicensed band (e.g., for more efficient UL transmission). Detailed implementations for AUL in unlicensed band may not be defined. Directional transmission with AUL may need to be considered since NR unlicensed transmission may be directional.

Scheduled and autonomous UL HARQ transmissions may be performed. For a scheduled UL transmission, an STA may be unable to transmit if, for example, it is requested to perform LBT before transmission and the medium is busy at the scheduled transmission time. Implementations may be needed to improve the robustness of channel access in AUL access.

Acknowledgment for uplink configured transmissions may be used. A timer may be used that upon expiration (e.g., implicitly) indicates to the WTRU that a transmission is acknowledged. The timer may be used for licensed bands (e.g., with K repetition transmissions).

K repetitions may not (e.g., always) be performed due to LBT. This may make an uplink transmission less reliable. A timer implementation may be disclosed.

A WTRU may transmit in an uplink when the uplink resources are allocated to a configured transmission. In an unlicensed spectrum, other devices may occupy the transmission channel.

CWS adjustment for CBG based transmission may be addressed. A contention window size (CWS) may be adjusted based on an acknowledgement. For example, if a positive acknowledgement is received, then the CWS may be reset to a minimum value, and if a negative acknowledgement is received, or no acknowledgement is received within a certain period, the CWS may be doubled or set to the maximum value. When code block group (CBG) based transmission is used, an acknowledgement may carry acknowledgements for one or more CBGs. It may be possible to receive both positive and negative acknowledgement for CBGs. One or more features may be provided to adjust the CWS in such a case.

Features associated with self-contained data and HARQ-ACK transmissions may be provided. For example, one or more features may be provided that are associated with self-contained channel occupation time (COT) transmissions. COT may be used to refer a continuous transmission time. A gNB may compete and acquire media and reserve a transmission over the COT. A self-contained COT may have one or more of the following transmitted within the COT: higher layer information and configurations used by the COT; COT configuration information; or data transmission and corresponding acknowledgements.

NR slot transmissions may be used as a baseline. A gNB operating in an unlicensed band may perform LBT (e.g., before DL transmission) on a carrier. Different types of LBT or channel access priority classes may be applied. The LBT parameters may be determined by the contents of the DL transmission. One or more of the following may apply. If a DL transmission carries PDCCH and/or a following UL transmission carries PUCCH, the channel access priority may be high. For example, the channel access priority class may be set to 1 or 2. In If a DL transmission carries PDSCH and/or a following UL transmission carries PUSCH, the channel access priority may be low. For example, the channel access priority class may be set to 3 or 4.

Transmission over an unlicensed band may use (e.g., may start) a DL transmission with LBT. A gNB and WTRUs may (e.g., may then) exchange packet transmissions (e.g., multiple times) within a Channel Occupation Time (COT). The duration of the COT may be limited by the maximum COT (MCOT), which may be determined by regulations. Within the COT, the gNB and WTRUs may perform limited LBT. For example, the gNB and WTRUs may not perform LBT or may perform LBT with a fixed contention window size.

Figure 2:
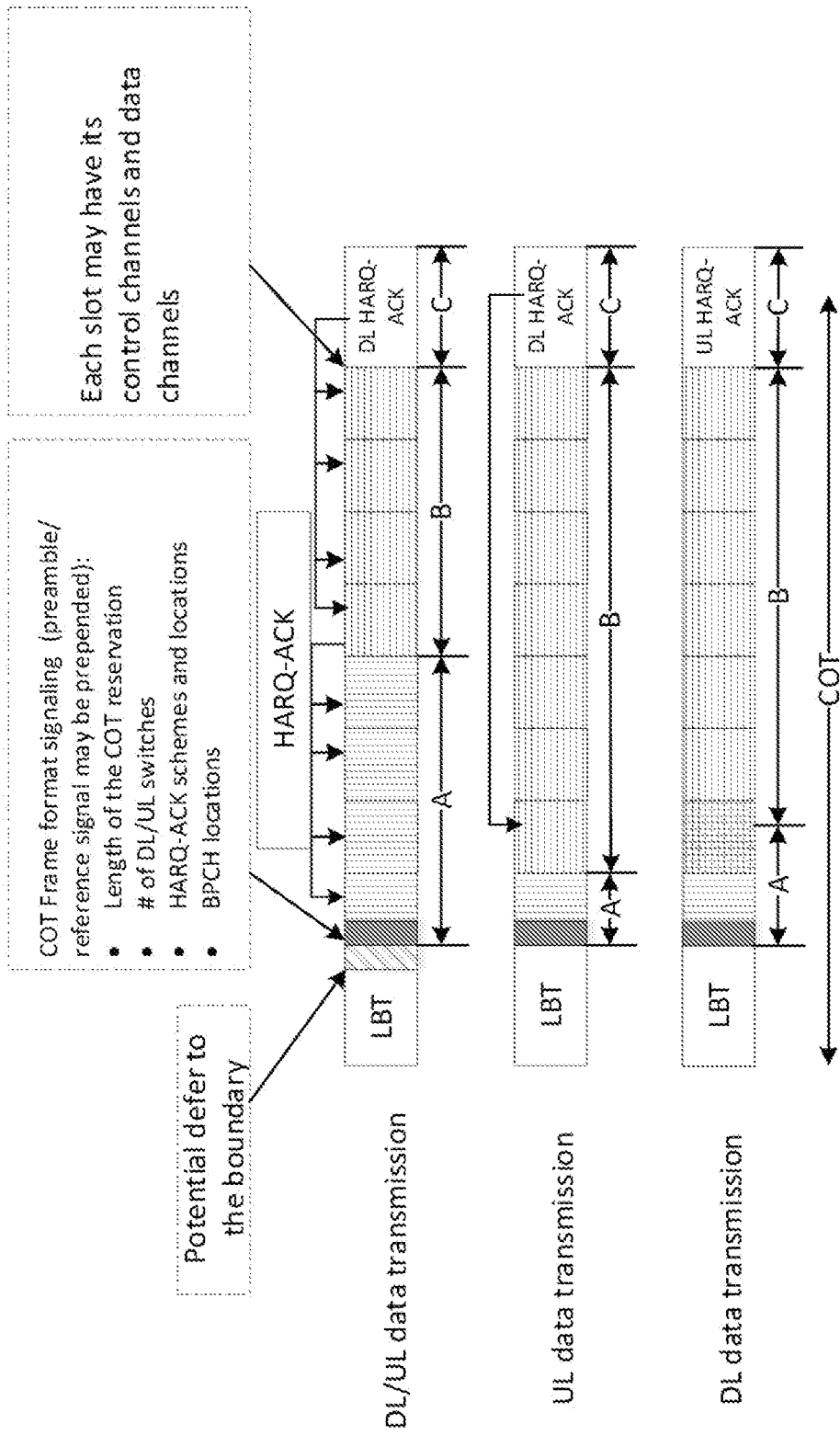
FIG. 2 shows an example associated with DL/UL transmissions.

FIG. 2 shows an example associated with DL/UL transmissions. As shown in FIG. 2, depending on the use of the COT, one or more of the following may be associated with a data transmission scheme (e.g., for a first implementation). DL and UL data transmissions may be used within a COT (e.g., the COT may be shared for UL and DL data transmissions). A COT may be used (e.g., primarily) for UL data transmission. A COT may be used (e.g., primarily) for DL data transmission.

For DL/UL data transmissions within a COT, e.g., the COT may be used for DL and UL data transmissions, one or more of the following may apply. One or more DL slots/subframes may be scheduled within the COT. One or more UL slots/subframes may be scheduled in the COT (e.g., after the DL OFDM symbols). One or more DL slots may be used for HARQ-ACK transmissions associated with previous UL data transmissions.

A DL slots/subframes may be scheduled (e.g., at the beginning of the COT) and a (e.g., the first) DL slot may be a partial slot (e.g., where the number of symbols carried in the partial slot is less than the number of symbols carried in a full slot). A DL slot (e.g., each DL slot) may carry PDCCH and/or PDSCH. PDCCH may carry grants for DL and UL data/HARQ-ACK transmission. PDSCH may be present when DL data transmission is carried.

B UL slots/subframes may be scheduled following the DL slots/subframes within the COT. A UL slot (e.g., each UL slot) may carry PUCCH and may carry PUSCH if applied. HARQ-ACK transmissions (e.g., associated with previous DL transmissions) may be carried in PUCCH. HARQ-ACK transmissions (e.g., some HARQ-ACK transmissions) may be aggregated with uplink data and carried in PUSCH. Static and dynamic HARQ-ACK timing may be applied. With a static HARQ-ACK implementation, depending on the configuration of A and B, a mapping between a UL slot and a DL slot may be established. The HARQ-ACK information transmitted over the $n^{th}$ UL slot (where n≤B) may be used as acknowledgement for the $k^{th}$ DL slot (where k≤A). With a dynamic HARQ-ACK implementation, HARQ-ACK information may be transmitted in a scheduled UL slot (e.g., the first (or $m^{th}$, where m≤B) scheduled UL slot) for the WTRU. If more than one PDSCHs is transmitted to the WTRU, the WTRU may perform HARQ-ACK multiplexing and/or bundling. If the WTRU is not able to transmit HARQ-ACK information on the scheduled time slot (e.g., due to LBT), the gNB may consider the transmission a failure of the HARQ-ACK. Retransmission of the DL packet may be performed later. A gNB may expect (e.g., may alternatively expect) the HARQ-ACK back within a predefined/predetermined period. If the gNB does not receive it within the period, the gNB may consider the transmission a failure of the HARQ-ACK and prepare retransmission. The WTRU may try to transmit HARQ-ACK in the scheduled time slot. If the WTRU does not transmit the HARQ-ACK (e.g., due to LBT), it may try to retransmit the HARQ-ACK in the earliest possible time slot within the predefined/predetermined expected HARQ-ACK time period.

C DL slots, if used, may be presented for HARQ-ACK transmissions (e.g., associated with previous UL data transmissions). The C DL slots may be appended after the UL slots within the COT. Static and dynamic HARQ-ACK timing may be applied. With a static HARQ-ACK implementation, depending on the configuration of A, B and C, a mapping between a UL slot and a DL slot may be established. The HARQ-ACK information transmitted over the $c^{th}$ DL slot (where c≤C) may be used as acknowledgement for the $b^{th}$ UL slot (where b≤B). With a dynamic HARQ-ACK implementation, HARQ-ACK information may be transmitted in a scheduled DL slot (e.g., the first (or $c^{th}$, where c C) scheduled DL slot). If more than one PUSCH is transmitted from the WTRU (e.g., during the B UL slots), the gNB may perform HARQ-ACK multiplexing and/or bundling.

For UL data transmissions within a COT, e.g., the COT may be used, at least in part, for UL data transmission, one or more of the following may apply. One or more DL slots/subframes may be scheduled within the COT. One or more UL slots/subframes may be scheduled in the COT (e.g., after the DL OFDM symbols). One or more DL slots may be used for HARQ-ACK transmissions associated with previous UL data transmissions.

A DL slots/subframes may be scheduled at the beginning of the COT. A DL slot (e.g., the first DL slot) may be a partial slot (e.g., where the number of symbols carried in the partial slot may be less than that in a full slot). A DL slot (e.g., each DL slot) may carry PDCCH, which may comprise grants for UL data/control transmissions. B UL slots/subframes may be scheduled following the DL slots/subframes within the COT. A UL slot (e.g., each UL slot) may carry PUCCH and may carry PUSCH if applied. C DL slots for HARQ-ACK transmissions for previous UL data transmission may be appended after the UL slots within the COT. Static and dynamic HARQ-ACK timing may be applied. With a static HARQ-ACK implementation, depending on the configuration of A, B and C, a mapping between UL slot and DL slot may be established. The HARQ-ACK information transmitted over $c^{th}$ DL slot (c≤C) may be used as acknowledgement for the $b^{th}$ UL slot (b≤B). With a dynamic HARQ-ACK procedure, HARQ-ACK information may be transmitted in a scheduled DL slot (e.g., the first (or $c^{th}$ slot, where c≤C) scheduled DL slot). If more than one PUSCHs is transmitted from the WTRU during the B UL slots, the gNB may perform HARQ-ACK multiplexing and/or bundling.

For DL data transmissions within a COT, e.g., the COT may be used, at least in part, for DL data transmission, one or more of the following may apply. One or more DL slots/subframes may be scheduled within the COT. One or more UL slots/subframes may be scheduled in the COT (e.g., after the DL OFDM symbols).

A DL slots/subframes may be scheduled at the beginning of the COT, and a DL slot (e.g., the first DL slot) may be a partial slot (e.g., where the number of symbols carried in the partial slot is less than that in a full slot). A DL slot (e.g., each DL slot) may carry PDCCH and may carry PDSCH if applied. PDCCH may carry grants for UL data/HARQ-ACK transmission.

B UL slots/subframes may be scheduled following the DL slots/subframes within the COT. A UL slot (e.g., each UL slot) may carry PUCCH. HARQ-ACK transmissions for previous DL transmission may be carried in PUCCH. With a static HARQ-ACK implementation, depending on the configuration of A and B, a mapping between a UL slot and a DL slot may be established. The HARQ-ACK information transmitted over the $n^{th}$ UL slot (where n≤B) may be used as acknowledgement for the $k^{th}$ DL slot (where k≤A). With a dynamic HARQ-ACK implementation, HARQ-ACK information may be transmitted in a scheduled UL slot (e.g., the first (or $m^{th}$, where m≤B) scheduled UL slot) for the WTRU. If more than one PDSCH is transmitted to the WTRU, the WTRU may perform HARQ-ACK multiplexing and/or bundling. If the WTRU is not able to transmit HARQ-ACK information on the scheduled time slot (e.g., due to LBT), the gNB may consider the transmission a failure of the HARQ-ACK. Retransmission of the DL packet may be performed later. A gNB may expect (e.g., may alternatively expect) the HARQ-ACK back within a predefined/predetermined period. If the gNB does not receive the HARQ-ACK within the period, the gNB may consider the transmission a failure of the HARQ-ACK and prepare retransmission. The WTRU may try to transmit HARQ-ACK in the scheduled time slot. If the WTRU does not transmit the HARQ-ACK (e.g., due to LBT), it may try to retransmit the HARQ-ACK (e.g., in the earliest possible time slot within the predefined/ predetermined expected HARQ-ACK time period).

FIG. 2 illustrates an example associated with DL/UL transmissions that may be slot-based, and a slot (e.g., each slot) may have control channels and data channels (e.g., each slot may carry control information and data for multiple WTRUs). A, B and C in FIG. 2 may be in units of slot/subframes. A, B and C may be (e.g., may also or alternatively be) in units of OFDM symbols, frames, or another type of time period.

The last part of transmission in the COT may be used to carry an acknowledgement of a previous transmission, which may make the COT self-contained.

The sizes of the slots, either for DL or UL, in terms of number of OFDM symbols in a COT, may be different. The duration of the OFDM symbols may be different (e.g., depending on the choice of OFDM numerologies for those slots).

Figure 2B:
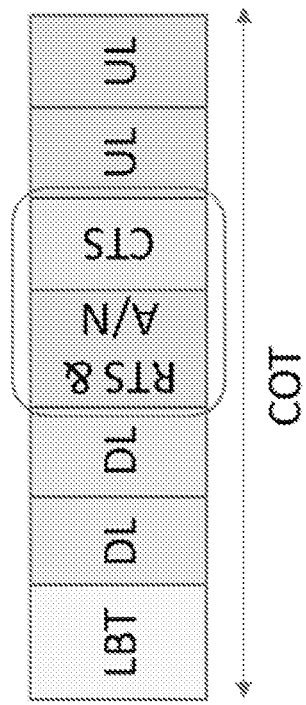
FIG. 2B shows an example of a transmission of HARQ-ACK with handshaking signaling with RTS.
Figure 2A:
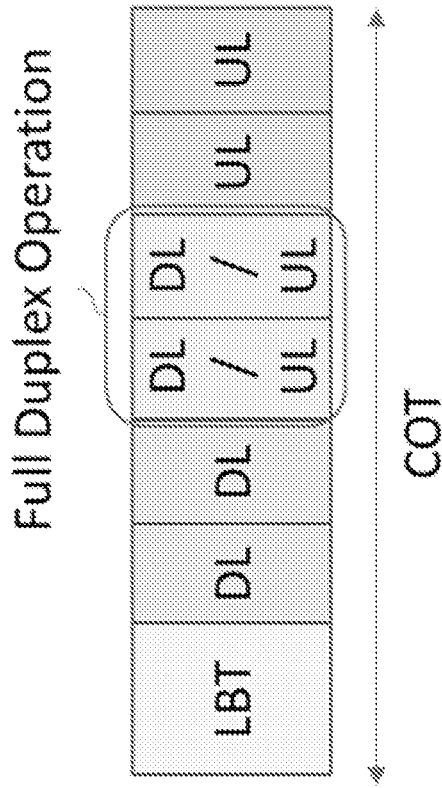
FIG. 2A shows an example of COT with collocated full duplex slots.

One or more slots in a self-contained COT may be used (e.g., simultaneously) for UL and DL transmission (e.g., if the network supports devices (gNB or WTRU) with full duplex radio capability). The simultaneous UL and DL slots may be distributed or collocated within a COT. FIG. 2A shows an example of a COT with collocated full duplex slots. LBT and possible handshaking (e.g., RTS (Require to Transmit)/CTS (Clear to Transmit) protocol) may be used separately (e.g., if the source of DL and the destination of UL transmissions are different nodes, e.g., for directional transmission and reception for each node).

An interference avoidance mechanism (e.g., for LBT allocated at the start of COT), such as RTS/CTS, may be used (e.g., when the link between a gNB and a WTRU switches from DL to UL or to continue transmission in DL or UL). A part of an RTS signal may carry HARQ-ACK information. The communication direction may continue to be in DL mode for retransmission (e.g., if the feedback is NACK), and the next transmission may wait until the next COT. FIG. 2B shows an example of a transmission of HARQ-ACK with handshaking signaling with RTS.

Figure 3:
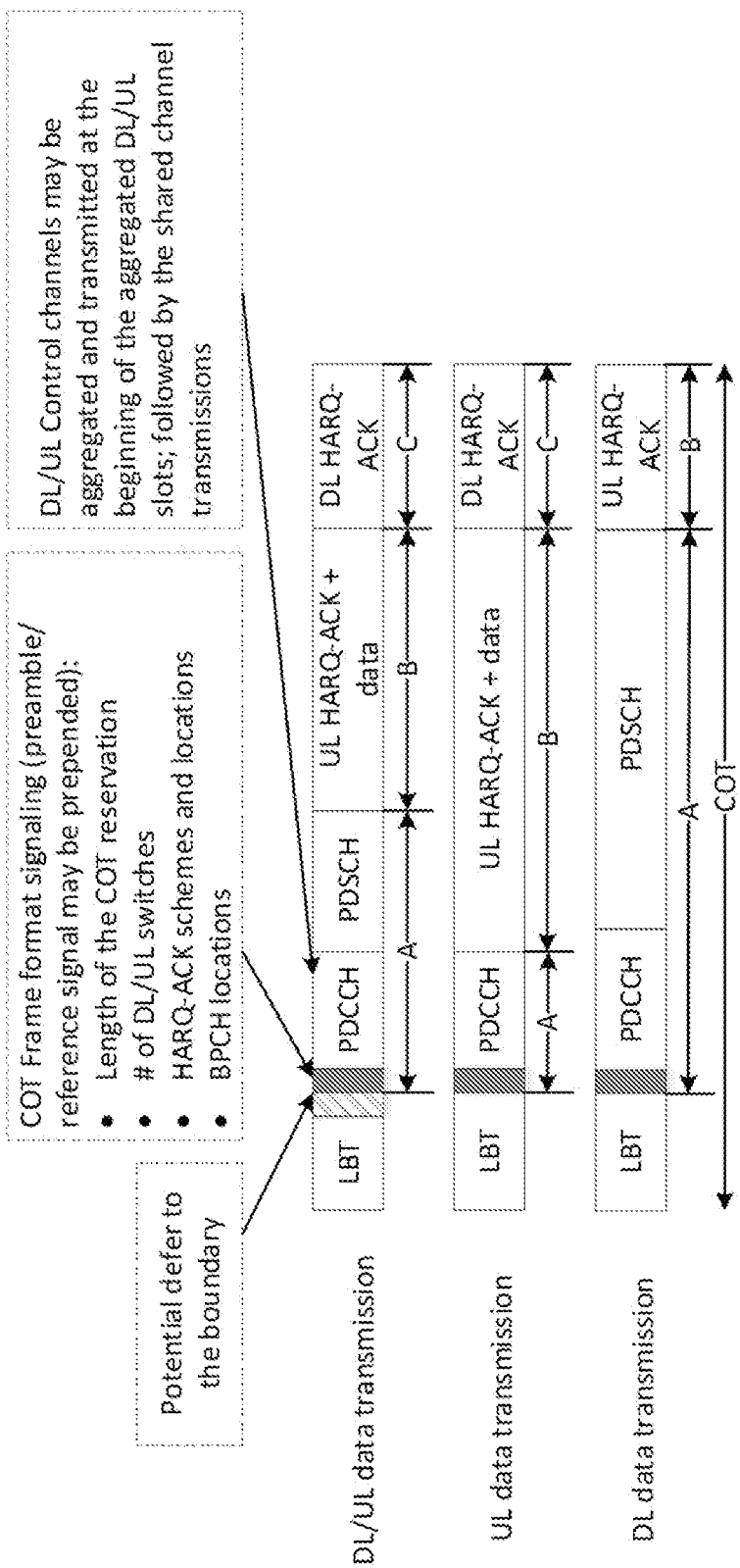
FIG. 3 shows another example associated with DL/UL transmissions.

DL/UL control channels may be aggregated and transmitted (e.g., at the beginning of aggregated DL/UL slots), and may be followed by the shared data channels. As shown in FIG. 3, depending on the use of the COT, one or more of the following may be associated with a data transmission scheme (e.g., and one or more features may be illustrated in FIG. 3). DL and UL data transmissions may be used within a COT (e.g., the COT may be used for UL and DL data transmissions). A COT may be used (e.g., primarily) for UL data transmission. A COT may be used (e.g., primarily) for DL data transmission.

For DL/UL data transmissions within a COT, e.g., the COT may be used for both DL and UL data transmissions, one or more of the following may apply. One or more DL OFDM symbols may be scheduled within the COT. One or more UL OFDM symbols may be scheduled in the COT (e.g., after the DL OFDM symbols). One or more DL OFDM symbols may be used for HARQ-ACK transmissions associated with previous UL data transmissions.

A DL OFDM symbols may be scheduled at the beginning of the COT. The DL transmission may start at an OFDM symbol boundary and a DL slot (e.g., the first DL slot) may be a partial slot (e.g., where the number of symbols carried in the partial slot is less than that in a full slot). DL control channels may be aggregated and transmitted (e.g., at the beginning of aggregated DL slots), and may be followed by the shared DL data channels. For example, A OFDM symbols may be involved in the DL transmissions. One or more (e.g., the first several) OFDM symbols may be used to carry PDCCH while the rest of the OFDM symbols may be used to carry PDSCH. PDCCH may carry grants for DL data transmission and UL data/HARQ-ACK/control information transmission. The DL transmission duration (e.g., the whole duration) may be considered as a super or aggregated DL frame. A slot/subframe structure may be implemented that reuses an NR numerology and transport block design. A Downlink Control Information (DCI) search space may be implemented for an aggregated frame structure. For a WTRU, one or more DCIs and/or PDSCHs may be assigned, e.g., in the DL aggregated transmission slot.

B UL OFDM symbols may be scheduled (e.g., following the DL transmissions within a COT). UL control channels may be aggregated and transmitted (e.g., at the beginning of aggregated UL slots), and may be followed by one or more shared UL data channels. For example, B OFDM symbols may be used in the UL transmissions. One or more (e.g., the first several) OFDM symbols may be used to carry PUCCH while the rest of the OFDM symbols may be used to carry PUSCH. HARQ-ACK transmissions (e.g., for previous DL transmissions) may be carried in PUCCH. Some HARQ-ACK transmissions may be (e.g., may alternatively be) aggregated with uplink data and carried in PUSCH. Both static and dynamic HARQ-ACK timing may be applied. With a static HARQ-ACK implementation, depending on the configuration of A and B, a mapping (e.g., between a UL slot and a DL slot) may be established. The HARQ-ACK information transmitted over the $n^{th}$ UL slot may be used as acknowledgement for the $k^{th}$ DL slot. With a dynamic HARQ-ACK implementation, HARQ-ACK information may be transmitted in a scheduled UL slot (e.g., the first (or $m^{th}$) scheduled UL slot) for the WTRU. If more than one PDSCH is transmitted to the WTRU, the WTRU may perform HARQ-ACK multiplexing and/or bundling. If the WTRU is not able to transmit HARQ-ACK information on the scheduled time slot (e.g., due to LBT), the gNB may consider the transmission failure of the HARQ-ACK. Retransmission of the DL packet may be performed later. The gNB may expect (e.g., may alternatively expect) the HARQ-ACK back within a predefined/predetermined period. If the gNB does not receive the HARQ-ACK within the period, the gNB may consider the transmission failure of the HARQ-ACK and prepare retransmission. The WTRU may try to transmit HARQ-ACK in the scheduled time slot. If the WTRU does not transmit the HARQ-ACK (e.g., due to LBT), it may try to retransmit the HARQ-ACK (e.g., in the earliest possible time slot within the predefined/predetermined expected HARQ-ACK time period).

C DL OFDM symbols, if used, may be presented. for HARQ-ACK transmissions (e.g., associated with previous UL data transmissions). The C DL OFDM symbols may be appended after the UL transmission within the COT. Both static and dynamic HARQ-ACK timing may be applied. With a static HARQ-ACK implementation, depending on the configuration of A, B and C, a mapping (e.g., between a UL slot and a DL slot) may be established. The HARQ-ACK information transmitted over the $c^{th}$ DL slot may be used as an acknowledgement for the $b^{th}$ UL slot. With a dynamic HARQ-ACK implementation, HARQ-ACK information may be transmitted in a scheduled DL slot (e.g., the first (or $c^{th}$) scheduled DL slot). If more than one PUSCH is transmitted from the WTRU during the B UL slots, the gNB may perform HARQ-ACK multiplexing and/or bundling.

For UL data transmissions within a COT, e.g., the COT may be primarily used for UL data transmission, one or more of the following may apply. One or more DL OFDM symbols may be scheduled within the COT. One or more UL OFDM symbols may be scheduled in the COT (e.g., after the DL OFDM symbols). One or more DL OFDM symbols may be used for HARQ-ACK transmissions associated with previous UL data transmissions.

A DL OFDM symbols may be scheduled (e.g., at the beginning of the COT). The DL transmission may start at an OFDM symbol boundary and a DL slot (e.g., the first DL slot) may be a partial slot (e.g., where the number of symbols carried in the partial slot is less than that in a full slot). DL control channels may be aggregated and transmitted (e.g., at the beginning of aggregated DL slots). For example, A OFDM symbols may be involved in the DL transmissions and may be used to carry PDCCH. PDCCH may carry grants for UL data/HARQ-ACK/control information transmission.

B UL OFDM symbols may be scheduled (e.g., following the DL aggregated transmissions) within the COT. A UL slot (e.g., each UL slot) may carry PUCCH and may carry PUSCH if applied. UL control channels may be aggregated and transmitted (e.g., at the beginning of aggregated UL slots), and may be followed by the shared UL data channels. For example, B OFDM symbols may be involved in the UL transmissions. One or more (e.g., the first several) OFDM symbols may be used to carry PUCCH while the rest of the OFDM symbols may be used to carry PUSCH.

C DL OFDM symbols, if used, may be presented for HARQ-ACK transmissions (e.g., associated with previous UL data transmissions). The C DL OFDM symbols may be appended after the UL transmission within the COT. Both static and dynamic HARQ-ACK timing may be applied. With a static HARQ-ACK implementation, depending on the configuration of A, B and C, a mapping (e.g., between a UL slot and a DL slot) may be established. The HARQ-ACK information transmitted over the $c^{th}$ DL slot may be used as acknowledgement for the $b^{th}$ UL slot. With a dynamic HARQ-ACK implementation, HARQ-ACK information may be transmitted in a scheduled DL slot (e.g., the first (or $c^{th}$) scheduled DL slot). If more than one PUSCH is transmitted from the WTRU during the B UL slots, the gNB may perform HARQ-ACK multiplexing and/or bundling.

For DL data transmissions within a COT, e.g., the COT may be primarily used for DL data transmission, one or more of the following may apply. One or more DL OFDM symbols may be scheduled within the COT. One or more UL OFDM symbols may be scheduled in the COT (e.g., after the DL OFDM symbols).

A DL OFDM symbols may be scheduled at the beginning of the COT. The DL transmission may start at an OFDM symbol boundary and a DL slot (e.g., the first DL slot) may be a partial slot (e.g., where the number of symbols carried in the partial slot is less than that in a full slot). DL control channels may be aggregated and transmitted (e.g., at the beginning of aggregated DL slots), and may be followed by the shared DL data channels. For example, A OFDM symbols may be involved in the DL transmissions. One or more (e.g., the first several) OFDM symbols may be used to carry PDCCH while the rest of the OFDM symbols may be used to carry PDSCH. PDCCH may carry grants for DL data transmission and UL HARQ-ACK/control information transmission. B UL OFDM symbols, if used, may be presented. The B UL OFDM symbols may be scheduled (e.g., following the DL transmissions within the COT). The UL transmission may carry HARQ-ACK information for previous PDSCH transmissions. Both static and dynamic HARQ-ACK timing may be applied.

FIG. 3 shows an example where DL/UL transmissions may be aggregated and slot based, and control channels may be aggregated and transmitted at the beginning of aggregated DL/UL slots.

The DL/UL transmission duration (e.g., the whole duration) may be considered as a super or aggregated DL/UL frame. A slot/subframe structure may be implemented (e.g., to reuse the NR numerology and transport block design). A DCI search space may be implemented (e.g., redesigned) for an aggregated frame structure. For a WTRU (e.g., a single WTRU), one or more DCIs may be used to schedule DL/UL transmissions.

The last part of transmission in the COT may be used to carry an acknowledgement of previous transmission, which may make the COT self-contained.

FIG. 4 shows an example associated with COT transmission procedures with multiple DL/UL switches.

The examples shown in FIGS. 2 and 3 may be extended to have multiple DL/UL exchanges in the COT. FIG. 4 shows an example of a COT with multiple DL/UL exchanges. As seen in FIG. 4, one or more (e.g., all) DL transmissions may have the same duration, e.g., A OFDM symbols/slots/sub-frames/frames, and one or more (e.g., all) UL transmissions may have the same duration, e.g., B OFDM symbols/slots/sub-frames/frames. Acknowledgements may be carried in the same COT, for example a DL HARQ-ACK transmission may be appended at the end of the COT, which may make the transmissions of the COT self-contained. The DL HARQ-ACK transmission may be associated with a previous UL transmission within the same COT. For example, the DL HARQ-ACK transmission may carry an ACK or a NACK for a given UL transmission in the COT.

The $k^{th}$ DL/UL transmission may have (e.g., may alternatively have) $A_k$ or $B_k$ OFDM symbols/slots/sub-frames/frames respectively. A (e.g., each) DL/UL transmission may have its own duration and may not be the same as other DL/UL transmissions in the COT.

COT frame format signaling (CFS) transmissions may be performed. A CFS transmission may be used to set up a COT transmission rule. One or more of the following may apply. A gNB (e.g., operating in an unlicensed band) may perform channel access (e.g., LBT) on a carrier. The gNB may acquire the media and transmit (e.g., at the boundary of an OFDM symbol) the carrier over the unlicensed band. One or more the following may apply. The gNB may start with a preamble signal to one or more WTRUs. The preamble signal may be transmitted over omni direction. The preamble signal may be (e.g., may alternatively be) transmitted and repeated over multiple directions. The preamble signal may be a known sequence transmitted over one or more (e.g., the first several) symbols. The preamble signal may be a common reference, a discovery signal, etc.

The gNB may transmit (e.g., may then transmit) a CFS, which may be used to assist unlicensed band transmission. The CFS transmission may be allocated in the symbol after preamble symbols. The CFS transmission may use the (e.g., all the) subcarriers in the frequency domain or a set of subcarriers in the frequency domain. The information included in a CFS may include one or more of the following: COT configuration information, HARQ-ACK configuration information for the COT, periodical scheduling in the COT, autonomous UL (AUL) transmissions in the COT, standalone operation indication, or channel aggregation.

One or more of the following may apply for COT configuration information. If COT configuration information is missing from a CFS, the COT configuration may be the same as for previous a COT. For example, one or more of the following may be included in the COT configuration information: the length and/or duration of the COT, DL/UL configuration in the COT, and whether the COT is self-contained. By reading the length or duration of the COT, the WTRU, which may not be transmitting and/or receiving in the COT, may switch to power saving mode until the end of the COT. The DL/UL configuration in the COT may include the number of DL/UL or UL/DL switches in the COT, the size of A (e.g., a number of DL OFDM symbols), B (e.g., a number of UL OFDM symbols) and/or C (e.g., a number of DL OFDM symbols for HARQ ACK transmissions associated with a previous UL transmission), etc. If the COT is self-contained, an extra C OFDM symbols/slots DL or UL may be included.

One or more of the following may apply for HARQ-ACK configuration information for the COT. If HARQ-ACK configuration information is missing from the CFS, the HARQ-ACK configuration may be the same as for a previous COT. For example, one or more of the following may be included in the HARQ-ACK configuration information: transport block (TB)/CBG transmission, TB/CBG level HARQ-ACK, a HARQ-ACK bundling/multiplexing enabled flag, and HARQ-ACK timing. TB/CBG transmission may indicate (e.g., by a subfield) whether CBG level transmission is allowed in the COT. TB/CBG transmission may be common for one or more (e.g., all) intended WTRUs in the COT or may be WTRU-specific. TB/CBG level HARQ-ACK may indicate (e.g., by a subfield) whether TB level or CBG level HARQ-ACK is allowed in the COT. TB/CBG level HARQ-ACK may be common for one or more (e.g., all) intended WTRUs in the COT or may be WTRU-specific. A HARQ-ACK bundling/multiplexing enabled flag may be used to indicate (e.g., by a subfield) whether HARQ-ACK bundling is enabled and whether HARQ-ACK multiplexing is enabled. The HARQ-ACK bundling/multiplexing enabled flag may be common for one or more (e.g., all) intended WTRUs in the COT or may be WTRU-specific. HARQ-ACK timing may indicate (e.g., by a subfield) that static or dynamic HARQ-ACK timing may be used in the COT. HARQ-ACK timing may be common for one or more (e.g., all) intended WTRUs in the COT or may be WTRU-specific.

One or more of the following may apply for periodical scheduling in the COT. Periodical scheduling in the COT may be used to indicate (e.g., by a subfield) if periodical DL transmission, UL transmission or DL/UL transmission is allowed in the COT. Periodical scheduling in the COT may be common for one or more (e.g., all) intended WTRUs in the COT or may be WTRU-specific. Detailed per-WTRU periodical scheduling may be carried in DCI.

One or more of the following may apply for autonomous UL (AUL) transmission in the COT. Autonomous UL (AUL) transmission in the COT may be used to indicate (e.g., by a subfield) if autonomous UL transmissions are allowed in the COT. Detailed AUL scheduling may be carried in DCI.

One or more of the following may apply for standalone operation indication. The indication may be used to indicate whether the COT is standalone, and/or that there is a licensed channel to assist the transmission of the COT.

One or more of the following may apply for channel aggregation. A channel aggregation field may be used to indicate the operating channel in the unlicensed band. The field may contain maximum operating channel bandwidth and/or the number of aggregated channels utilized in the COT.

After the CFS transmission, the gNB may transmit PDCCHs, which may carry common and dedicated control information for DL/UL transmissions.

The CFS information may be carried in the anchor channel which may be a licensed band. The CFS information may be carried in a (e.g., the first) DL slot. If the DL slot is a partial slot, and does not have enough resource symbols to carry the CFS, two slots (e.g., the first two slots) may be used to carry CFS.

If AUL transmission is allowed for the COT, the AUL transmission may be scheduled earlier than scheduled UL transmissions (SUL) (e.g., so that the acknowledgement of AUL transmission is carried in the same COT). Acknowledgement for AUL transmission may have a longer time delay than that of SUL transmission.

Active WTRUs (e.g., all active WTRUs) may monitor the preamble and CFS over an unlicensed band. Common search space for a WTRU on an unlicensed band may start from the preamble or discovery signal of the DL transmission.

In an implementation, the information contained in CFS may be carried in a higher layer signal, e.g., an RRC signal. The signal may be transmitted over an unlicensed band with a standalone transmission. The signal may be carried over a licensed band where licensed band is served as anchor channel to assist unlicensed transmission.

In examples, CFS transmissions may be carried at the beginning of the COT and may be transmitted once.

The CFS may carry information for WTRUs, which may not be part of the COT transmission. In order to make WTRUs (e.g., all WTRUs) have a chance to receive CFS, all or part of the information carried in CFS may be repeated and transmitted multiple times in the COT.

In examples, the CFS transmission may be repeated and transmitted multiple times in the COT.

In examples, some information in the CFS, e.g., referred to as partial CFS, may be repeated and transmitted multiple times.

The CFS may be a newly designed channel for unlicensed bands. CFS may be (e.g., may alternatively be) transmitted using PDCCH and/or PDSCH. For example, a DCI carried by common PDCCH may include a grant for a PDSCH transmission. The PDSCH may carry the CFS and WTRUs (e.g., all the WTRUs) may need to monitor the PDSCH. The CFS may be carried in the PDSCH.

LBT may be performed. Transmission in an unlicensed spectrum may follow LBT regulations. Even though a gNB may schedule a slot for UL transmission for a WTRU, the WTRU may (e.g., may still need to) perform LBT, and may not be able to transmit over the scheduled slot. Transmissions (e.g., acknowledgements) may be protected from interference by performing LBT.

In examples, the gNB may grant one or more resources for HARQ-ACK transmissions. The grant may be through multiple DCIs, or through one DCI (e.g., for a semi-static periodic scheduling). The granted resources may be on different time symbols/slots/subframes/frames. WTRUs, which may not be able to transmit on a grant (e.g., due to LBT), may be able to transmit on another grant. One or more of the following may apply.

In examples, the grant may be used to schedule HARQ-ACK for a specific WTRU. More than one WTRU may be scheduled for a same resource or a same set of resources for HARQ-ACK transmission (e.g., to improve spectrum efficiency). In examples, with semi-static periodic scheduling for specific HARQ-ACK transmission, a preference order may be included for a WTRU. The preference order may be assigned by the gNB. A WTRU may follow the order to use assigned resources to transmit HARQ-ACK if LBT allows.

For example, the gNB may assign N UL resources for a WTRU (e.g., WTRU1) to transmit HARQ-ACK. The preference order may have length N and may indicate the preference priority of an assigned UL resource (e.g., each assigned UL resource). The WTRU may try to transmit on UL resources with a highest preference priority if LBT allows. Otherwise, the WTRU may try to transmit on UL resources with a second highest preference priority, and so on. The gNB may assign the same set of N UL resources for another WTRU (e.g., WTRU2) with a different preference order (e.g., so that the transmissions from WTRU1 and WTRU2 may be distinguished with high probability). HARQ-ACK transmissions from WTRU1 and WTRU2 may be distinguished through code domain or spatial domain techniques. One or more of the following may apply for the grant transmitted by the gNB. The grant may be transmitted through a dedicated transmission to a WTRU (e.g., each WTRU). The grant transmitted may be an allocation of N resources, which may be provided through a group based PDCCH, and a preference order may be provided through dedicated transmissions. The grant may be transmitted through a group-based allocation transmission through PDCCH and/or PDSCH. In an example, the grant may be used for autonomous HARQ-ACK transmissions for multiple WTRUs.

A COT may be released. For example, a gNB may stop a COT transmission before a period for which the gNB has reserved the COT has expired. At the beginning of the COT, a set of parameters may be used to indicate the length of DL and UL transmissions in the COT. The gNB may be able to terminate the COT transmission if no more traffic is available.

In examples, the gNB may transmit a common PDCCH, which may include a DCI for COT termination. In the DCI, the length of the COT may be set to 0 (e.g., to indicate the end of COT transmission). WTRUs may (e.g., may need to) monitor the DCI and may notice the end of COT. Other gNBs may monitor the DCI and notice the end of the COT, and may try (e.g., may then try) to compete for the media.

HARQ-ACK transmission within a COT may be used. An acknowledgement may not be able to be received (e.g., for transmissions that happen at the end of a COT) within a COT (e.g., due to the processing time). COT end techniques may be used to make the acknowledgement transmission self-contained in the COT.

The terminology maximum channel occupation time (MCOT) and COT may be used interchangeably.

Figure 4A:
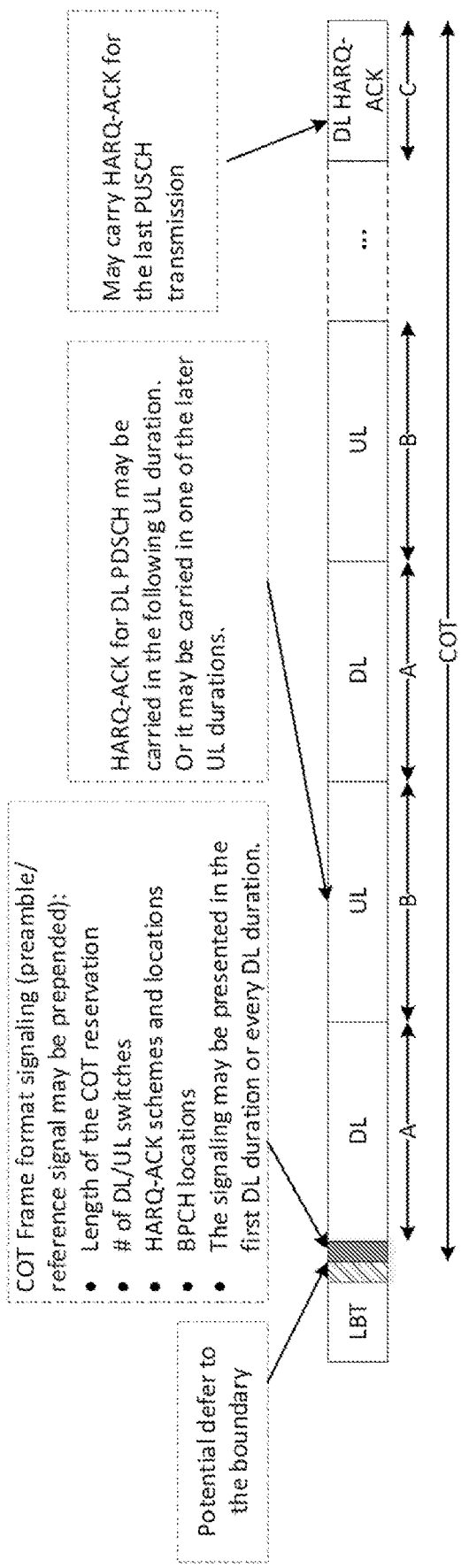
FIG. 4A shows an example associated with COT transmissions.
Figure 4B:
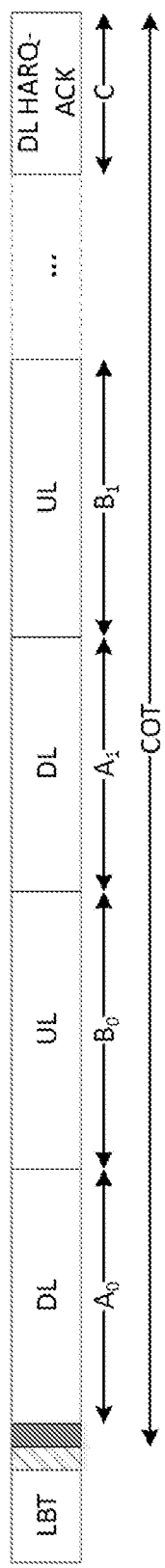
FIG. 4B shows another example associated with COT transmissions.
Figure 4C:
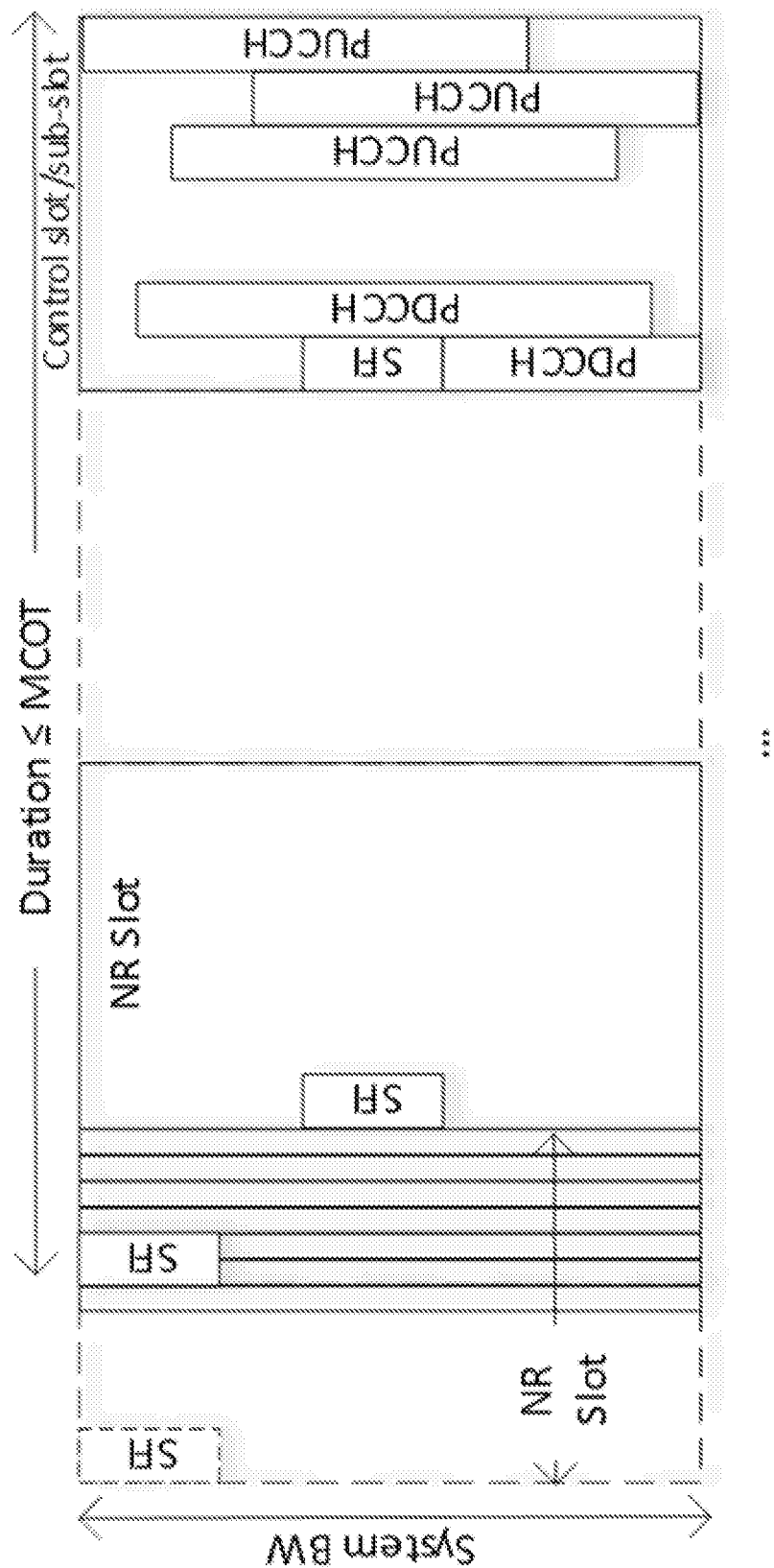
FIG. 4C shows an example of a structure of an NR slot for NR-U with the last slot/subslot as a control slot.

Control slot/mini-slot for NR-unlicensed operation may be used. During an MCOT, a gNB may schedule DL and UL exchanges. The gNB may perform one or more of the following before the end of the MCOT. The gNB may send (e.g., all) the remaining HARQ-ACKs to the previously received TBs in PUSCH before the end of the MCOT. The gNB may schedule (e.g., all) the remaining HARQ-ACKs to the previously TBs sent in PDSCH before the end of the MCOT. The gNB may schedule WTRU scheduling requests (e.g., that may be addressed in the next MCOT) before the end of the MCOT. The gNB may send a SSB/PBCH before the end of MCOT. The gNB may send CSR-RS to one or more WTRUs and/or schedule a (e.g., aperiodic) CSI report from one or more WTRUs before the end of the MCOT. The gNB may attempt one or more of these in the last slot or mini-slot (sub-slot) of the MCOT. The last slot/mini-slot may be referred to as control slot. The slot/minislot may mostly carry control channels (e.g., PDCCH and PUCCH) and/or broadcast signals/channels (e.g., SSB/PBCH). The gNB may configure (e.g., for a WTRU to detect PDCCHs) an NR-U WTRU with one or more search spaces (e.g., for WTRU-specific PDCCHs or group common PDCCHs) for example where the WTRU searches within these search spaces at the last slot or sub-slot of the MCOT. FIG. 4C shows an example structure of an NR slot for NR-U with the last slot/subslot being a control slot.

A gNB may configure a (e.g., one) NR-U WTRU or a group of NR-U WTRUs with one or multiple search spaces (e.g., that are expected to carry one or more PDCCH in the last slot or sub-slot before the end of an MCOT).

Figure 4D:
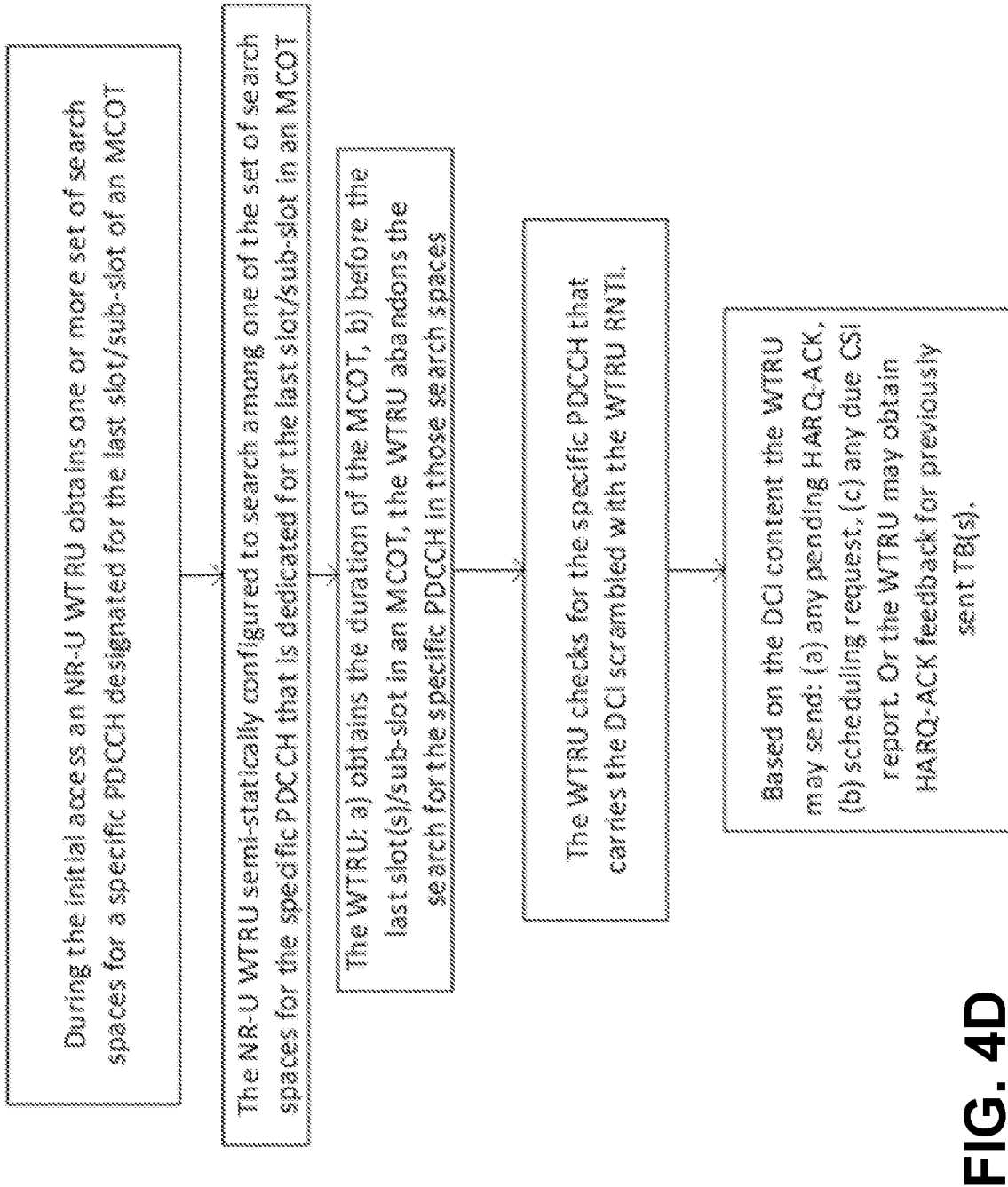
FIG. 4D shows an example of a WTRU procedure at the end of a MCOT.

An NR-U WTRU may be configured by its gNB with one or multiple search spaces (e.g., that are expected to carry one or more PDCCHs in the last slot or sub-slot before the end of an MCOT). FIG. 4D shows an example of a WTRU technique at the end of an MCOT. The WTRU may detect the PDCCHs with a WTRU-specific RNTI or with a group RNTI. The WTRU may not have exchanged data during the MCOT. The WTRU (e.g., when its periodic CSI report is approaching) may check the specific PDCCH to determine whether a PUSCH is assigned for a CSI report transmission. The WTRU may (e.g., if the WTRU has not exchanged data during the MCOT) monitor the specific PDCCH to determine whether any PUCCH is assigned to the WTRU (e.g., to send a scheduling request that the gNB fulfills in the next MCOT).

Figure 4E:
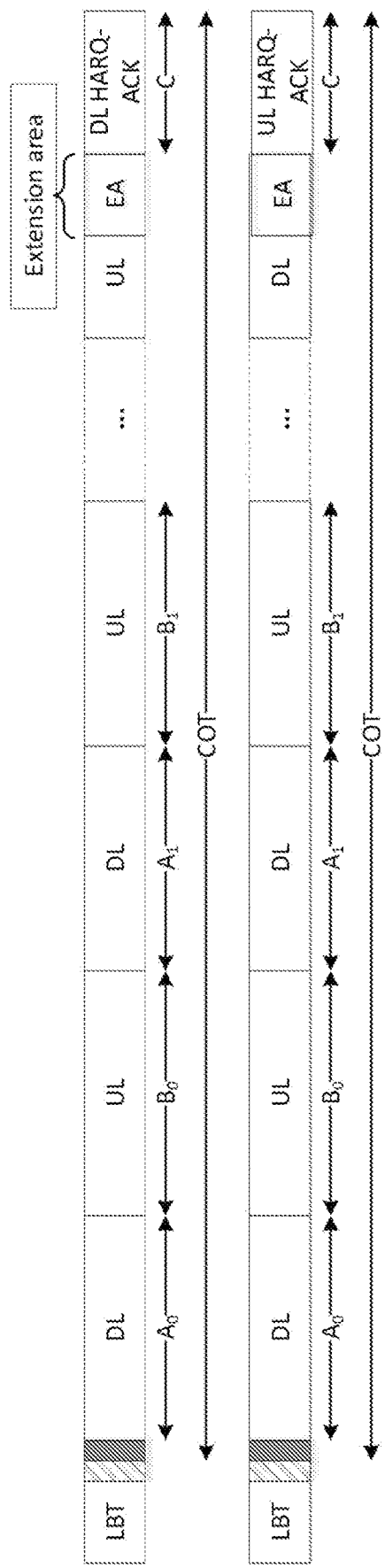
FIG. 4E shows an example of an extension area with a COT based transmission.

An extension area may be used. A (e.g., the last) DL or UL transmission occasion may be reserved for HARQ-ACK transmission. A transmission occasion before (e.g., immediately before) the one reserved for HARQ-ACK transmission (e.g., in order to have enough processing time), may have an extension area at the end, (e.g., see FIG. 4E). FIG. 4E shows an example of an extension area in a COT based transmission. The extension area may be used for transmissions which do not require HARQ-ACK and/or reference signal transmissions.

The existence of the extension area and/or the size of extension area (which may be in units of OFDM symbols) may be signaled in the COT. For example, the signaling and configurations may be carried in CFS. Whether the extension area is present and/or the size of an extension area may be predefined.

The extension area may be added at the end of a DL and/or UL transmission occasion in an unlicensed band. An extension area may reserve the media, allow a gNB/WTRU to have more time to process received signals, and/or provide a gNB/WTRU more time to prepare upcoming transmissions. The existence and the size of an extension area may be signaled in DCI in PDCCH. The DCI that carries the extension area information may be a common DCI. An RNTI may be assigned for extension area allocation.

Multiple user concurrent UL transmissions may be used.

Figure 4F:
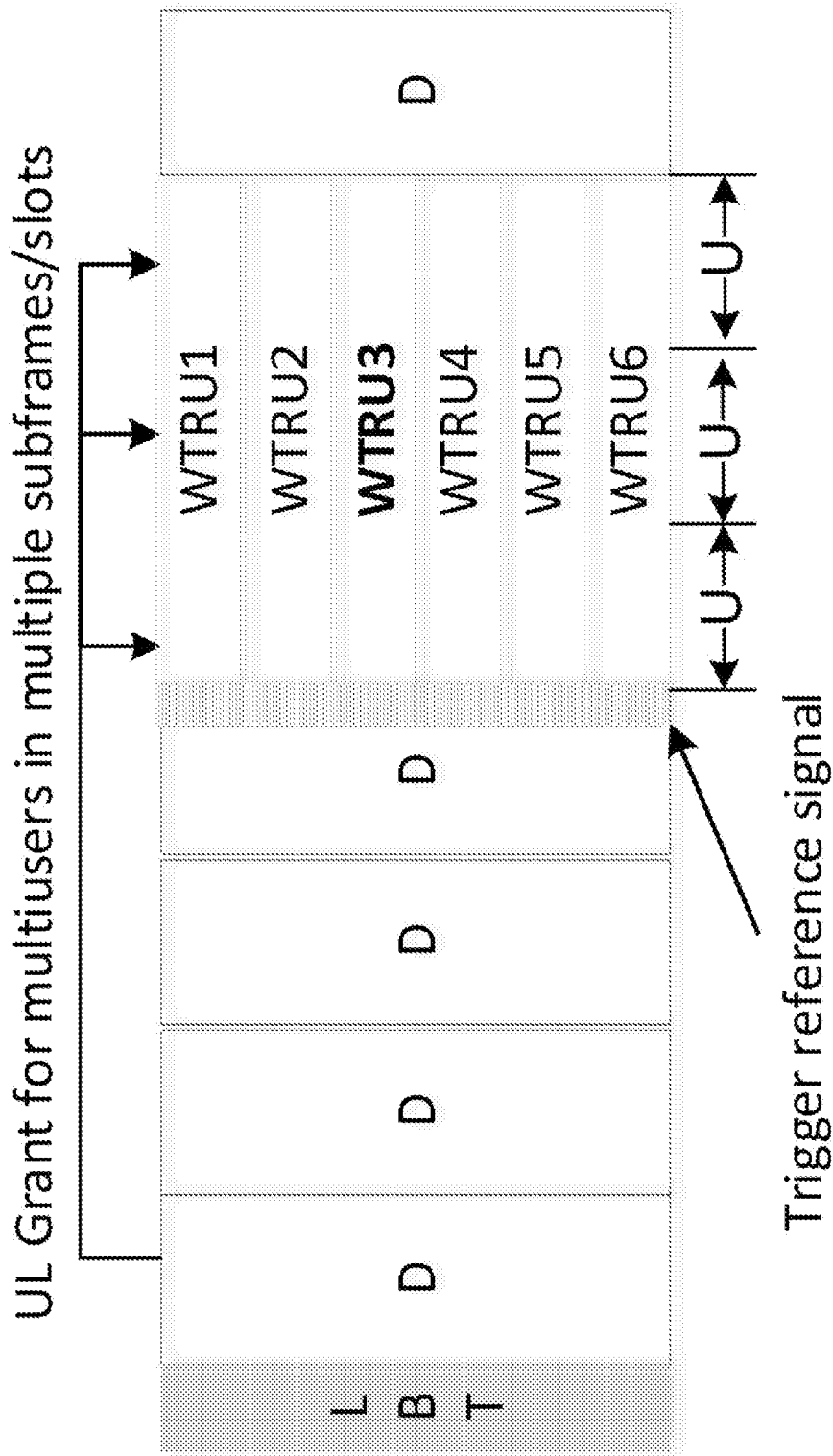
FIG. 4F shows an example of a delayed trigger and a trigger reference signal.

A delayed trigger and/or a trigger reference signal may be used (e.g., to enable multi-user concurrent UL transmissions in NR-U). A gNB may acquire a channel using LBT with random backoff. A gNB may share a COT with multiple WTRUs (e.g., multiple WTRUs may transmit concurrently using different frequency resources). A trigger reference signal may be included in a DL slot (e.g., the last DL slot). A WTRU may use the trigger reference signal to synchronize in time/frequency domain. An example of a delayed trigger and a trigger reference signal is shown in FIG. 4F.

A gNB may acquire a channel using LBT with random backoff. The gNB may start a shared COT with one or more DL/UL switches. Shared COT information may be signaled in CFS or a DL control channel.

A gNB may transmit UL grants through DCI or other control channels (e.g., as early as possible such that there may be enough processing time for the WTRUs to prepare a corresponding UL transmission). In a UL grant, one or more of the following may be signaled. Concurrent UL transmissions may be signaled in a UL grant. When this field is set, a WTRU may notice that the corresponding UL transmissions may be shared with other WTRUs A trigger reference signal indication may be signaled in a UL grant. The trigger reference signal indication may be signaled by including the indication in a DL slot (e.g., the last DL slot) and the WTRU may use the indication to synchronize in the time/frequency domain. Resource allocation may be signaled in a UL grant. A WTRU may be assigned using different frequency domain resource units. If the assignment is valid for one UL slot, multiple slots are available in the shared COT, and the same frequency resources are allocated to one WTRU, the WTRU may use more than one DCI. A DCI may be used to indicate allocation for more than one UL slot. UL frequency hopping may be applied to the allocation with a frequency hopping pattern explicitly or implicitly signaled.

The gNB may continue to transmit other DL control and data channels. The gNB may transmit a trigger reference signal (e.g., at the end of a DL transmission). The trigger reference signal may have good correlation properties. For example, a WTRU may detect the trigger reference signal by performing correlation between the received signal and a saved trigger reference signal (e.g., auto-correlation). If the WTRU successfully detects the trigger reference signal, the WTRU may determine to transmit the UL signal (e.g., after the trigger reference signal). A WTRU may use the trigger reference signal to perform synchronization. A DL transmission slot may be assigned to one or more WTRUs (e.g., all WTRUs or WTRUs that may transmit concurrently in the UL). A UL assignment may imply that the WTRU may monitor the DL transmission prior to its UL assignment.

A WTRU (e.g., which may be assigned for UL transmission) may perform LBT with fixed duration. A WTRU may adjust its timing advance (e.g., based on the trigger reference signal), so that the transmitted signals may reach the gNB concurrently. A WTRU may adjust its frequency offset precorrection (e.g., based on the trigger reference signal), so that the transmitted signals may reach the gNB aligned. For example, signals from multiple WTRUs may be aligned in time and/or frequency at the gNB.

FIG. 4F shows a set of WTRUs that may be allocated to one or more UL slots (e.g., all of the UL slots). A different set of WTRUs may be allocated to different UL slots. For example, WTRU1-WTRU6 (e.g., UE1-UE6) may be allocated to UL slot 1, WTRU7-WTRU10 (e.g., UE7 to UE 10) may be allocated to UL slot 2, and WTRU11 (e.g., UE 11) may be allocated to UL slot 3.

AUL Transmissions may be performed. One or more of the following may be associated with AUL transmissions.

Figure 5:
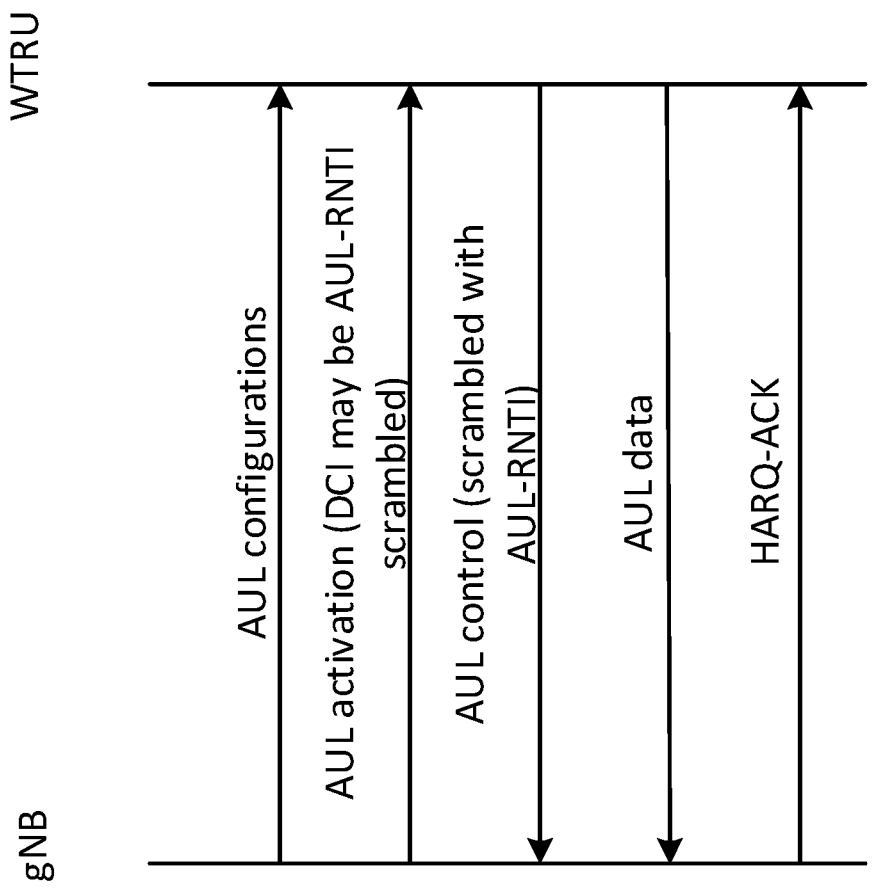
FIG. 5 shows an example associated with AUL transmissions.

An example associated with AUL transmission is shown in FIG. 5. A gNB may transmit AUL configuration information for a COT in CFS. AUL configuration information may include one or more of the following: whether AUL transmission is allowed in the COT, whether AUL transmission with directional reception is allowed in the COT, a HARQ-ACK mechanism for AUL transmission, a AUL control channel transmission rule, or a LBT category/type used in the COT.

A HARQ-ACK mechanism for AUL transmission may include one or more of the following: whether codebook based per WTRU HARQ-ACK is used, whether resource location based HARQ-ACK is used, whether directional HARQ-ACK is used, or an RV order.

One or more of the following may apply for the AUL control channel transmission rule. AUL transmission may be contention based, and the WTRUs (e.g., all the WTRUs) may take the chance to transmit. WTRUs may indicate (e.g., may need to indicate) their identity and corresponding control information (e.g., to decode data). This field may be used to assign a general AUL control channel transmission rule for the COT. The control channel transmission rule may include: AUL-RNTI, configuration of AUL PUCCH, and/or configuration of AUL PUSCH.

An AUL-RNTI may be used to identify transmissions of AUL control channels in the COT. The AUL-RNTI assigned here may be valid within the COT. The gNB may use the AUL-RNTI to scramble the DCI, which may carry AUL activation and deactivation information, e.g., allocation of AUL activation information. A WTRU (e.g., each WTRU) that may transmit AUL may use the AUL-RNTI to scramble the AUL control information. This information may be (e.g., may alternatively be) predefined or determined by a higher layer (e.g., as per cell information). In this case, the AUL-RNTI may be valid for the entire cell and may not be COT specific.

Configuration of AUL PUCCH may define the generic search space configuration for an AUL control channel. The search space may be used for the gNB to search AUL control information for a WTRU (e.g., each WTRU). The search space may define the CCE aggregation level for AUL control channel. The CCE aggregation level may be defined together with the type of PUCCH, or explicitly as AUL CCE aggregation level. This information may be (e.g., may alternatively be) predefined and may be the same for all the COTs. Signaling may not be necessary.

Configuration of AUL PUSCH may assign (e.g., by a field) an AUL PUSCH transmission rule. For example, a gNB may determine the number of Resource Blocks (RBs) that may be used for an AUL PUSCH (e.g., each AUL PUSCH). This information may be (e.g., may alternatively be) predefined or predetermined and signaling may not be needed.

An LBT category/type used in the COT may indicate (e.g., by a field) whether LBT is used (e.g., before each transmission). If LBT is used, the LBT category/type may indicate what type of LBT may be used. For example, LBT with a fixed contention window size or LBT with a random contention window size may be used. In examples, LBT schemes (e.g., all kinds of LBT schemes) may be put in a table and the row indices may be used to signal the LBT type. WTRUs that receive this field may use the corresponding LBT scheme (e.g., before each transmission in the COT). Multiple LBT types may be (e.g., may alternatively be) allowed in a COT. Different types of transmission may use different types of LBT schemes in the COT. For example, UL control channel and UL data transmission may be allowed to use different types of LBT. UL data transmissions with different WTRU priorities and traffic types may use different types of LBT. In examples, the UL transmission (e.g., all the UL transmission) may not use LBT or may use LBT with a fixed contention window size.

A gNB may activate AUL transmission by setting a detailed configuration of the AUL resources. The AUL activation information may be carried in a PDCCH or a PDSCH. The PDCCH, which may be used to carry an AUL activation information or allocate for an AUL activation, may have the corresponding DCI AUL-RNTI scrambled. The AUL activation information may include time resources and frequency resources for AUL transmission, and/or an AUL counter.

One or more of the following may apply for time and frequency resources for AUL transmission. The gNB may set time resources and frequency resources for AUL control channel transmission and another set of time resources and frequency resources for AUL data channel transmission. In some cases, the periodic AUL may be used within a COT. In that case, the periodicity of the AUL allocation may be signaled.

One or more of the following may apply for the AUL counter. There may be multiple AUL transmission opportunities in a COT, and the AUL counter may be used to identify an AUL transmission. The AUL counter may be used later in the acknowledgement for AUL transmission. For periodic AUL allocation, the AUL counter for a first AUL transmission may be given. For the following AUL transmission, the counter may be increased or decreased by 1 (e.g., each time). The AUL counter for a series of AUL allocations may be predefined or predetermined. For example, the AUL counter may be derived by a function.

The WTRU may choose one or more AUL resource units for AUL transmissions. The WTRU may perform random back off and transmission on AUL resources. One or more of the following may be associated with the random access and back off and transmission.

The WTRU may randomly select a number in $R \in [0, R_c)$, where $R_{min} \le R_c \le R_{max}$. $R_{min}$ and $R_{max}$ may be predefined or predetermined. $R_{min}$ and $R_{max}$ may be (e.g., may alternatively be) configurable (e.g., based on the WTRU priority or access category). The WTRU may compare R with K. K may be the number of RBs allocated for AUL transmission.

If R≤K, the WTRU may transmit in one or more randomly selected AUL resources on which the gNB receive sector/beam/precode matches the WTRU selected gNB receive sector/beam/precoder. For example, a gNB may change its receive sector (e.g., in the spatial domain) from one RB to another RB. If the WTRU uses an RB, the WTRU may know the corresponding gNB receive sector on the RB. The WTRU may know the corresponding transmit sector to use for maximized link strength. In examples, a gNB may announce it will use gNB receive sector 1 to receive on K RBs. The WTRU, which may know that gNB receive sector 1 is the best receive sector for itself, may use one or more of the K RBs to transmit. In examples, the WTRU may transmit on the $R^{th}$ resource over the K AUL resources. In examples, the WTRU may randomly select a number R0 and transmit on the $R0^{th}$ resources over the K AUL resources. If R>K, the WTRU may set R=R−K and wait for the next AUL transmission.

The random access and back off techniques described herein may be used to transmit AUL control information for the WTRU. The transmission of the AUL data may be determined by the transmission of the AUL control information. For example, the selected AUL data resource unit may be signaled in the AUL control information. The selected AUL data resource unit location may be (e.g., may alternately be) a function of a selected AUL control resource unit location. The function may be predefined or predetermined. The random access and back off techniques described herein may be used to transmit AUL data for the WTRU. The selected AUL control resource unit location may be a function of a selected AUL data resource unit location. The random access and back off techniques described herein may be used to transmit AUL control information and data for the WTRU, e.g., two separate random accesses may be applied and one back off may be applied.

The WTRU may transmit an uplink control channel, which may be referred to as AUL PUCCH, together with the AUL data channel. The AUL PUCCH may be WTRU-specific. In the control channel, the WTRU may indicate one or more of the following: modulation and coding scheme (MCS), HARQ process ID, RV, new data indication (NDI), TBS (or other type of length field to indicate the size of AUL transmission), or AUL counter. In examples, the AUL control information from one or more of the (e.g., all) WTRUs may have a fixed size (e.g., to reduce the overhead of UL control channel). The same size of physical time frequency resources may be used to carry AUL control information, e.g., the same number of control channel elements (CCEs) or control-resource sets (CORESETs) and the same aggregation level may be used for AUL PUCCH. The fixed size may be predetermined or configurable. If the size is configurable, the gNB may determine the size and signal it in DCIs, which may be used to activate the AUL transmission, or CFS, which may be used to setup (e.g., all) the AUL transmission for the COT.

The WTRU may transmit an uplink data channel, which may be referred to as AUL PUSCH. In examples, the WTRU may determine the number of resource blocks that may be used for the transmission and signal the number of resource blocks in the AUL PUCCH. In examples, the gNB may set the number of resource blocks used for a WTRU.

The gNB may transmit HARQ-ACK information, e.g., back to WTRUs. The HARQ-ACK transmission may be a codebook based WTRU specific HARQ-ACK carried in PDCCH or a resource location based HARQ-ACK carried in PDCCH.

One or more of the following may apply for a codebook based WTRU specific HARQ-ACK carried in PDCCH. If the gNB receives the AUL control information correctly from an WTRU, the gNB may send a positive or negative acknowledgement back to the WTRU. If the gNB detects the AUL data transmission correctly or incorrectly, the gNB may send a positive or negative acknowledgement back to the WTRU. If the gNB does not receive the AUL control information correctly, the gNB may not transmit any acknowledgement to the WTRU.

One or more of the following may apply for a resource location based HARQ-ACK carried in PDCCH. The HARQ-ACK transmission may be broadcasted to one or more (e.g., all) WTRUs active in the COT. The acknowledgement may include information on whether the gNB successfully decoded information carried by a RB or a set of RBs. The location of the RB or the set of RBs may be explicit or implicit. If the location of the RBs are explicit, a RB index or indices for the set of RBs may be carried in the acknowledgement. If the location of the RBs are implicit, the RB index or indices for the set of RBs may be implicitly derived from the location of the HARQ-ACK RBs.

One or more of the following may apply if the location of the RBs are implicit. An AUL control channel may be carried in a set of RBs while an RB index (e.g., the first RB index) may be K. The AUL data channel may be carried in a set of RBs while an RB index (e.g., the first RB index) may be L. The AUL counter for the AUL transmission may be M. There may be a predefined or predetermined function, which may be used to determine a set of RBs used to carry acknowledgement of the transmission. Assuming the first RB index of the set of RBs used to carry acknowledgement is N, N=function (K, L, M) may be used. In examples, the function may be defined as N=function(K), N=function (K, M), N=function(L) or N=function (L, M).

The RB indices utilized herein may refer to physical RB indices or logical RB indices.

A combination of codebook based WTRU specific HARQ-ACK carried in PDCCH and a resource location based HARQ-ACK carried in PDCCH may be used. For example, codebook based WTRU-specific HARQ-ACK carried in PDCCH may be used for WTRUs for which AUL control information is successfully detected. A resource location based HARQ-ACK carried in PDCCH may be used for WTRUs for which AUL control information is lost.

If a periodic AUL allocation is granted, the gNB may have a chance to deactivate the allocation by transmitting a PDCCH which may be used to deactivate the periodic AUL transmission. The gNB may transmit a PDCCH to allocate a PDSCH. The AUL deactivation information may be carried by the PDSCH.

FIG. 5 shows an example associated with an AUL transmission.

An AUL-RNTI may be provided.

In examples, the UCI bits transmitted for autonomous transmission may be scrambled with a scrambler (e.g., a scrambler initialized with some common settings to decode the autonomous/grant-free WTRU transmissions). b(i) may denote the $i^{th}$ bit transmitted as UCI. A scrambling operation may be shown as:

$$\tilde{b}(i)=(b(i)+c(i)) \bmod 2 \qquad \text{Equation 1}$$

Where c(i) may be the scrambler. The scrambler may be a Linear Feedback Shift Register (LFSR), which may be initialized based on the cell ID, $N_{ID}^{Cell}$ and the RNTI index, $n_{RNTI}$. For example, in MulteFire, the scrambler may be based on an LFSR and its initialization may be given by:

$$c_{init} = \left(\left\lfloor \frac{n_s}{2} \right\rfloor + 1\right)(2N_{ID}^{Cell} + 1)2^{16} + n_{RNTI}.  \quad \text{Equation 2}$$

$n^{RNTI}$ may be controlled by the higher layers and assigned to the WTRUs. For autonomous or grant-free transmission, the base station may not expect the UCI transmission. For autonomous/grant-free WTRUs, $n_{RNTI}$ may be set to a certain value, e.g., 0. Other factors may be set to certain values, e.g., initialization index $n_s$, which may indicate an autonomous transmission.

Directional AUL transmissions may be performed.

A gNB may set its receive sector/beam/precoder on a (e.g., each) time-frequency resource unit allocated for AUL transmissions in AUL configurations for the COT, e.g., if the allocation is fixed for the COT (e.g., the entire COT). The gNB may set its receive sector/beam/precoder on a (e.g., each) time-frequency resource unit allocated to AUL activation for a particular AUL transmission.

Figure 6:
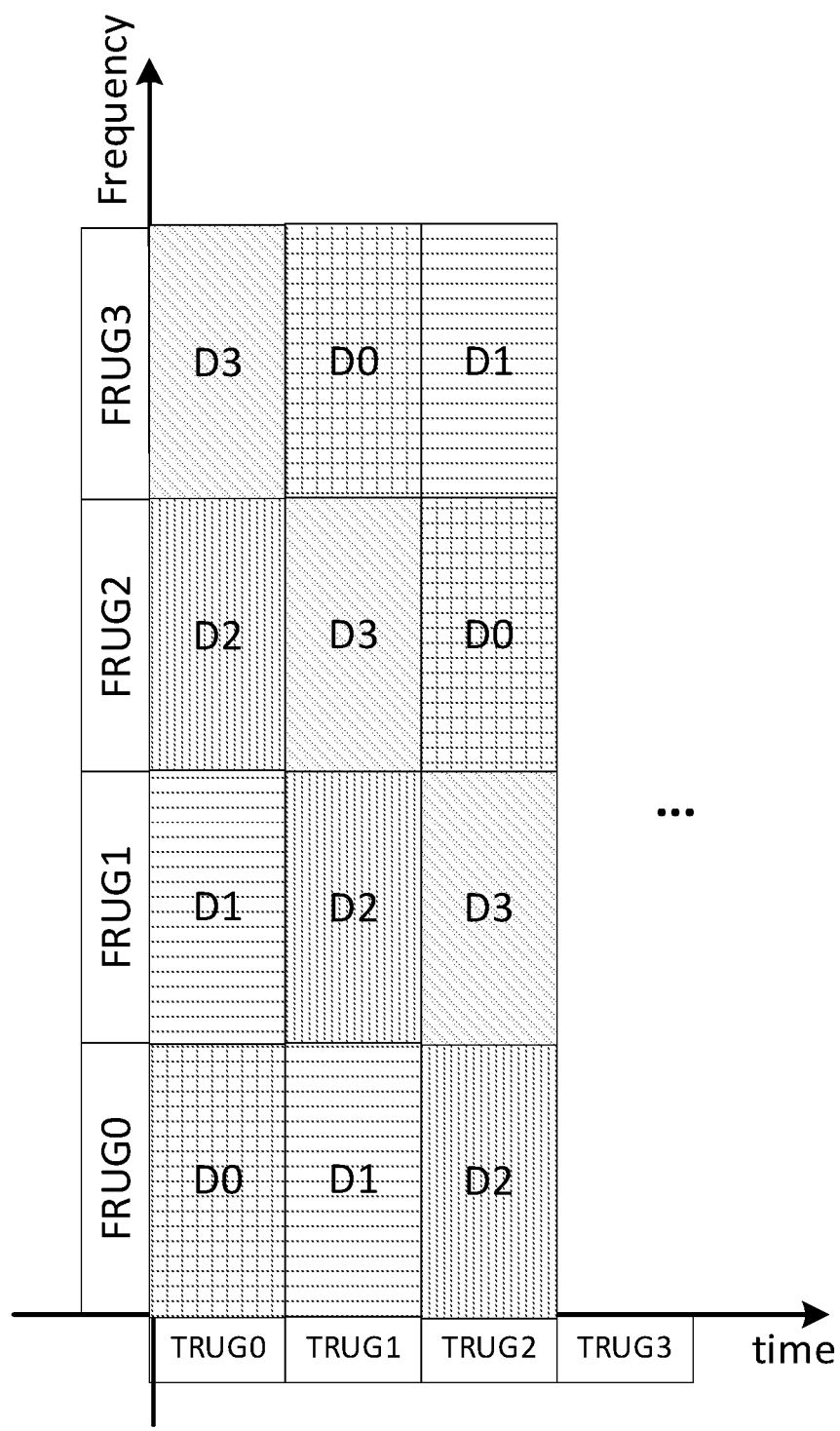
FIG. 6 shows an example associated with a gNB receive sector/beam/precoder allocation of AUL frequency/time resources.

AUL activation may be carried in PDCCH and/or PDSCH. Time-frequency resource units allocated to AUL transmissions and/or gNB receive sector/beam/precoder mappings on the resource units may be included in AUL activation. A time-frequency resource unit may be composed of multiple subcarriers in a frequency domain and multiple OFDM symbols in a time domain. The frequency resource may be contiguous or non-contiguous. One or more exemplary receive sector/beam/precoder allocations for the time-frequency resources may be disclosed herein. In examples, e.g., as shown in FIG. 6, M frequency domain resource unit groups (FRUGs) and N time domain resource unit groups (TRUGs) may be assigned for AUL transmission. A FRUG may be a resource block (RB), a resource block group, or another type of unit in the frequency domain. A TRUG may be an OFDM symbol, an OFDM symbol group, a slot, a subframe, a frame or another type of unit in the time domain.

A cyclic shifted Rx beam allocation (e.g., as shown in FIG. 6) may be provided. As seen in FIG. 6, for a TRUG, e.g., TRUG0, receive direction/sector/beam/precoder k may be used on the FRUG k. For the $L^{th}$ TRUG, e.g., TRUG L-1, receive direction/sector/beam/precoder mod (k+L, M) may be used on the FRUG k.

A one-dimensional Rx beam allocation may be provided. For the $k^{th}$ FRUG, and the $L^{th}$ TRUG, receive direction/sector/beam precoder L*M+k may be used.

Other types of allocations may be applied. In examples, M may be equal to 1 (e.g., one FRUG may be utilized to include all the subcarriers across the entire band). If M=1, the beam allocation may be across time domain units.

If the gNB is able to receive concurrently through multiple directions/sectors/beams/precoders, more than one directions/sectors/beams/precoders may be assigned to a (e.g., one) unit.

FIG. 6 shows an example of a gNB receive sector/beam/precoder allocation of AUL frequency/time resources.

One or more of the following may apply for a WTRU directional AUL transmission. A WTRU may know a best gNB receive sector/beam/precoder for the WTRU. Th WTRU may detect a PDCCH with a corresponding AUL-RNTI. The WTRU may choose one or more AUL resource units on which to transmit. The WTRU may receive an AUL acknowledgement from a gNB.

Before a transmission, a WTRU may know the best gNB receive sector/beam/precoder for the WTRU. The WTRU may detect a PDCCH with a corresponding AUL-RNTI. The WTRU may detect a DL-SCH transport block corresponding to the PDCCH. The WTRU may pass the transport block to higher layers. The higher layers may parse the DL-SCH and obtain one or more of the following: an AUL counter, the AUL time/frequency resource allocation, or the gNB receive sector/beam/precoder allocation over the AUL time/frequency resource. The AUL counter may be used to identify the AUL allocation. The AUL counter may be used in HARQ-ACK for AUL transmission.

The WTRU may choose one or more AUL resource units on which to transmit. The gNB receive sector/beam/precoder may match the WTRU-recorded best gNB receive sector/beam/precoder. If the WTRU performs random back off and transmission on AUL resources, the WTRU may use the receive direction to monitor the channel during the back off period. For example, M frequency domain resource unit groups (FRUGs) and N time domain resource unit groups (TRUGs) may be assigned for AUL transmission. There may be M×N resources for AUL transmissions. Among the M×N resources, K of them may be assigned with the WTRU-selected gNB receive sector/beam/precoder. One or more of the following may be associated with the random back off and transmission.

The WTRU may randomly select a number in $R \in [0, R_c)$, where $R_{min} \leq R_c \leq R_{max}$. $R_{min}$ and/or $R_{max}$ may be predefined or predetermined. $R_{min}$ and/or $R_{max}$ may be configurable based on the WTRU priority or access category. The WTRU may compare R with K. If $R \leq K$, the WTRU may transmit in one or more assigned AUL resources on which the gNB receive sector/beam/precoder matches the WTRU-selected gNB receive sector/beam/precoder. In examples, the WTRU may transmit on the Rth resource over the K AUL resources. In examples, the WTRU may randomly select a number R0 and transmit on the $R0^{th}$ resources over the K AUL resources. If R>K, the WTRU may set R=R-K and wait for the next AUL transmission. The WTRU may use directional or omni transmission.

The WTRU may receive AUL acknowledgement from the gNB. One or more of the following may apply for the HARQ-ACK transmission.

Directional HARQ-ACKs for AUL transmissions may be provided. HARQ-ACK transmissions may be directional. For example, the WTRU may transmits in the $k^{th}$ resource. The gNB may use direction/sector/beam/precoder m to receive the $k^{th}$ resource. The WTRU may expect an AUL acknowledgement, which may be carried on the $q^{th}$ DCI search space or DCI RB. The mapping (e.g., between k and q) may be predefined/predetermined or configured and signaled by the gNB. If channel or antenna reciprocity is applied, the AUL acknowledgement may be transmitted using a corresponding $m^{th}$ transmit direction/sector/beam/precoder. Otherwise, the AUL acknowledgement may be transmitted using the $m0^{th}$ transmit direction/sector/beam/precoder, where m0 may be determined by using a function of k.

Figure 7:
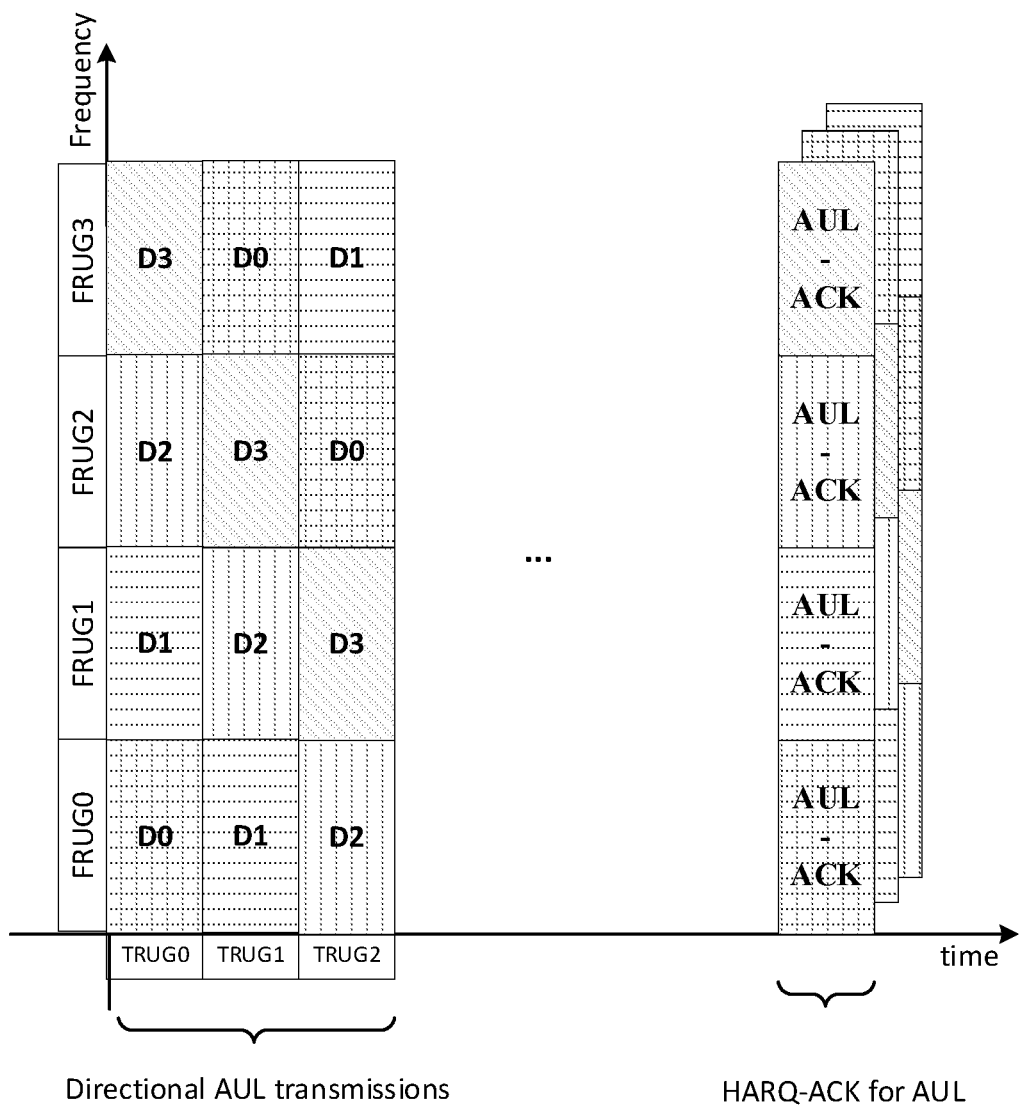
FIG. 7 shows an example associated with directional resource based HARQ-ACKs for AUL transmissions.

Spatial multiplexing HARQ-ACK transmission (e.g., as shown in FIG. 7) may be provided. A WTRU (e.g., WTRU1) may transmit in resource k1. The gNB may use, for example, direction/sector/beam/precoder m1 to receive resource k1. The WTRU may expect an AUL acknowledgement, which may be carried on the $q^{th}$ DCI search space or DCI RB. Another WTRU (e.g., WTRU2) may transmit in resource k2. The gNB may use direction/sector/beam/precoder m2 to receive resource k2. The other WTRU (e.g., WTRU2) may expect an AUL acknowledgement, which may be carried on the $q^{th}$ DCI search space or DCI RB. A predefined or predetermined function may be used to map k1 and/or k2 to q. The gNB may transmit acknowledgements to WTRU1 and WTRU2 using direction/sector/beam/precoder m1 and m2 respectively on RB q.

FIG. 7 shows an example associated with directional resource based HARQ-ACKs for AUL transmissions.

FRUGs (e.g., as shown in FIGS. 5 and 6) may be localized. FRUGs may refer to logic channels, which may be mapped to physical resources in DL and UL. With one or more mappings, the physical resources may be localized, distributed, or interlaced.

Code-division AUL transmissions may be provided. FIG. 6 shows an example associated with assigning a gNB receive sector to AUL time-frequency resources (e.g., so that a WTRU may compete with a smaller group of WTRUs that may be associated with the same gNB receive sector). A similar idea may be used with code domain division. A spreading code from a set of codes may be assigned to a time-frequency resource (e.g., each time-frequency resource) (e.g., instead of assigning gNB receive sectors). The set of codes may be predefined or predetermined. One or more pairs of codes in the set may be orthogonal to each other. In examples, more than one code may be assigned to a time-frequency resource (e.g., so that the transmissions on the resource may be distinguished using a code).

In examples, a WTRU (e.g., each WTRU) may be assigned a code (e.g., one code) during initial access. The WTRU may compete (e.g., since AUL transmission may be contention based) and choose a AUL time-frequency resource. The assigned code may match the WTRU code to transmit. The acknowledgement may be modulated with the assigned code to the WTRU.

In examples, a WTRU (e.g., each WTRU) may randomly select a code and may select a time-frequency resource associated with that code to transmit. The WTRU may randomly select a time-frequency resource and then randomly select a (e.g. one) code assigned on that resource to transmit.

Autonomous acknowledgement transmission may be used. A HARQ-ACK transmission from a WTRU to a gNB may not be able to transmit within a shared COT. The HARQ-ACK transmission may be delayed. A gNB may indicate in the DCI, which may grant a DL data transmission, that UL HARQ-ACK may be transmitted in an autonomous way, e.g., without grant. The gNB may allocate one or more resources for autonomous UL HARQ-ACK transmissions for one or more WTRUs (e.g., all WTRUs) using DCI or RRC signaling. WTRUs may compete and transmit the HARQ-ACK over the allocated resources.

Scheduled and autonomous UL HARQ transmission may be performed. In examples, WTRU access may be a combination of SUL and AUL. The HARQ configuration may indicate a (K, N) HARQ implementation. K may represent a number of resources explicitly scheduled by the gNB for a STA to transmit on for a specific HARQ process. In this case, the process may send up to K RVs before expecting an ACK (e.g., instead of a HARQ process sending data and expecting an ACK before resending a different RV). Due to the possibility of collisions in the unlicensed band, an RV (e.g., each RV) may be self-decodable. N may represent a number of times that the STA may autonomously access the channel if it is not able to access any of the scheduled resources due to an LBT failure (e.g., the medium is busy).

The LBT used during the SUL and AUL parts of the implementation may be configured differently.

The WTRU may transmit a different, self-decodable, RV on one or more of (e.g., each of) the 0, . . . , K–1 and 0, . . . , N–1 resources.

In examples, an ACK may be delayed till the end of the K retransmissions or may be transmitted by the gNB once data has been successfully decoded (a pre-emptive ACK transmission).

In examples, an AUL HARQ transmission may occur at a fixed duration (e.g., after the timing of the last resource). This duration may be configured semi-statically or dynamically by the gNB.

Figure 8:
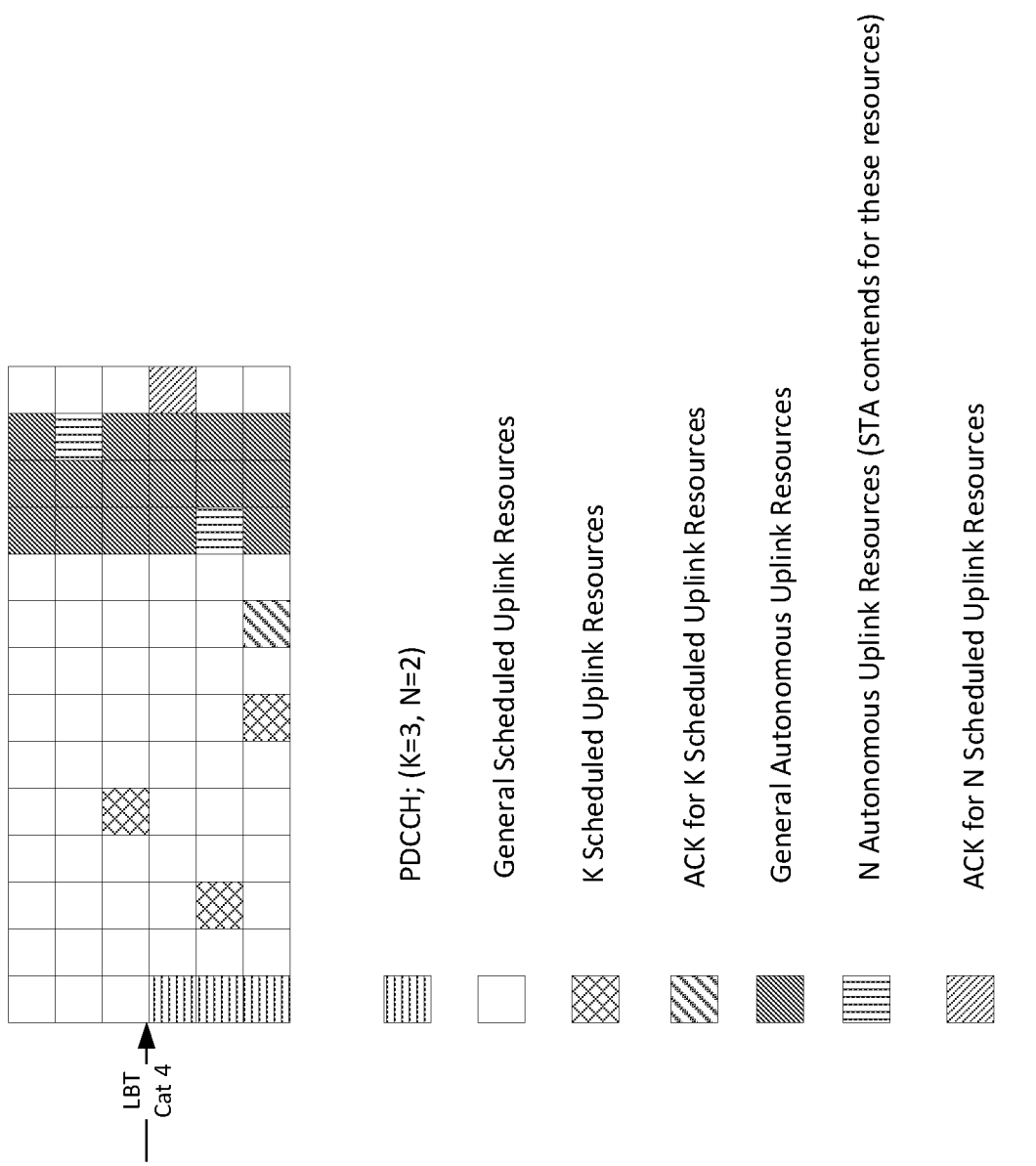
FIG. 8 shows an example associated with resource allocation and frame structure for SUL and AUL HARQ.
Figure 9:
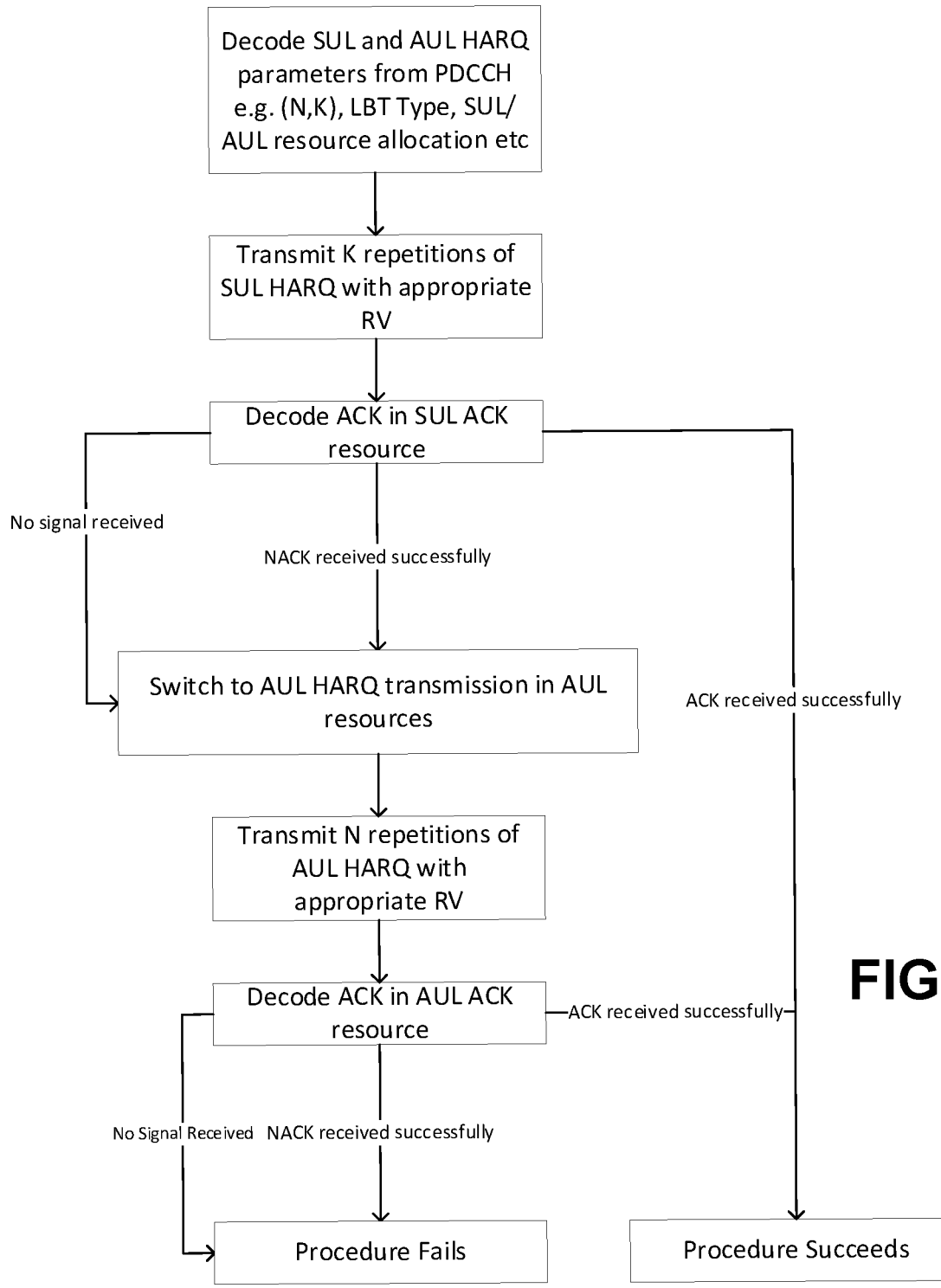
FIG. 9 shows an example associated with SUL and AUL HARQ.

Examples associated with scheduled and autonomous UL HARQ transmission are shown in FIGS. 8 and 9.

FIG. 8 shows an example associated with resource allocation and frame Structures for an exemplary SUL and AUL HARQ implementation with K=3 and N=2.

One or more of the following may apply for a SUL and AUL HARQ transmission. A WTRU may receive a DL PDCCH from a gNB upon the gNB successfully contending for the channel. The WTRU may send data associated with a specific HARQ ID on K scheduled resources, with desired/signaled RVs. The WTRU may listen to the scheduled HARQ ACK resource. The WTRU may contend for AUL resources and may send data associated with a specific HARQ ID on N resources with the desired/signaled RVs. The WTRU may listen to AUL HARQ ACK resource.

One or more of the following may apply for a WTRU receiving a DL PDCCH from a gNB upon the gNB successfully contending for the channel. The WTRU may decode SFI to identify UL and DL symbols in slot(s). The WTRU may decode scheduled and autonomous access resources. The WTRU may decode a set of LBT parameters to be used for scheduled access resources and a set of LBT parameters to be used for LBT for autonomous access resources. The LBT parameters for the scheduled access resources and the LBT parameters for the autonomous access resources may be different. The WTRU may decode HARQ parameters (K=3, N=2) and associated self-decodable RVs. The WTRU may decode resources for K HARQ repetitions. The WTRU may decode resources for the scheduled and autonomous access ACKs.

The WTRU may send data associated with a specific HARQ ID on the K scheduled resources with the desired/signaled RVs.

One or more of the following may apply when a WTRU listens to the scheduled HARQ ACK resource. If an ACK is received, then the WTRU may stop listening to the scheduled HARQ ACK resource. If a NACK is received or no signal is received (for example due to collisions in the SUL), the WTRU may switch to AUL access with N=2 repetitions.

The WTRU may contend for one or more AUL resources and may send data associated with a specific HARQ ID on N resources with the desired/signaled RVs.

One or more of the following may apply when a WTRU listens to AUL HARQ ACK resource. If an ACK is sent the WTRU may stop listening to the AUL HARQ ACK resource. If a NACK is received or no signal is received (for example due to collisions in the SUL), then the SUL and AUL HARQ transmission may fail.

FIG. 9 shows an exemplary SUL and AUL HARQ Procedure with K=3 and N=2.

HARQ Transmission using Random Resource selection and Confidence Factor Indication may be performed. One or more features associated therewith may relate to self-contained HARQ-ACK transmission.

A gNB may designate a pool of uplink resources (e.g., the combinations of one or more of RBs, slots, mini-slots, sectors, beams, etc.) to one or more WTRUs, which may be NR devices, NR-U devices, stand-alone (SA) or non-stand-alone (NSA), or any other types of devices. A resource (e.g., each resource), or a combination of resources (e.g., a combination of one or more of RBs, slots, mini slots, beams, sectors) may be associated with a response resource. The response resource may be used to send acknowledgements (e.g., ACK, NACK, or other types of responses) associated with UL transmissions received on the associated uplink resource. The designation of the pool of uplink resources may be transmitted by the gNB over PDCCH. The designation of the pool of uplink resources may be a response to one or more uplink requests sent by one or more WTRUs, e.g., over PUCCH.

A pool of response resources may be associated with a pool of designated uplink resources. The number of resources in the pool of response resources may be lower than the number of resources in the pool of the associated uplink resources (e.g., since some of the uplink resources are not utilized due to random selection in the uplink).

A WTRU may transmit a HARQ transmission using an (e.g., one) uplink resource or a combination of one or more uplink resources designated to itself or to a group to which the WTRU belongs. The selection of uplink resources may be random or may be based on an algorithm. The algorithm may be based on one or parameters announced by the gNB, or on the WTRU's WTRU ID. Such a transmission may be conducted on PUSCH. The uplink transmission may be done using non-orthogonal multiple access (NOMA) schemes. The WTRU may monitor the response resources associated with the uplink resources in which it chose to transmit in the uplink (e.g., after the transmission).

The gNB may monitor the designated uplink resources for uplink transmissions by the WTRUs. For an uplink resource or a combination of resources (e.g., each uplink resource or combination of resources), the gNB may determine of a confidence factor based on the received signals. The confidence factor may be defined as a measure of how confident the gNB is that a device has received a transmission. For example, the confidence factor may have values that apply to levels of confidence, e.g., a status, state, condition, etc. For example, a value may be associated with "no transmission detected", "low SNR", "additional HARQ needed", "collision detected", "correctly received", and/or "unknown". There may be a (e.g., one) value for each level of confidence. For example, a gNB may determine that no transmissions have been detected if no or very low energy has been detected in the uplink resources. For example, the gNB may determine that a collision has been detected if a significantly higher energy level is detected in a resource that should be considered as a valid transmission by one of the WTRUs, which may be expected given the WTRU's (e.g., or the group of WTRUs') distance from the gNB.

After correctly receiving an uplink transmission over the uplink resources, the gNB may transmit an ACK in the associated response resources. Otherwise, the gNB may transmit a NACK in the response resources. If a pool of response resources is designated for a pool of uplink resources, the gNB may transmit the ACK/NACK in the pool of response resources. The gNB may include the confidence factor in the acknowledgement (e.g., in the NACK). Additional resources may be allocated based on the confidence factor. Such allocation of additional resources may be included in the NACK or in separate transmissions, e.g., over PDCCH.

When the confidence factor indicates (e.g., has a value associated with) "no transmission detected", the gNB may skip the transmission of acknowledgement for the uplink resources. In examples, the gNB may transmit the NACK with a confidence factor indicating "no transmission detected". If a WTRU that transmits with a certain uplink resource, but does not receive a response or receives a response of NACK with a confidence factor indicating "no transmission detected", the WTRU may increase the transmit power, use beamforming, request a transmit power increase, etc.

When the confidence factor indicates "collision detected", the gNB may transmit a NACK for the identified uplink resource. The gNB may indicate the confidence factor and allocate more uplink resources for uplink transmissions. The WTRUs that receive a NACK and a confidence factor of "collision detected" may randomly choose one or more allocated uplink resources and conduct uplink transmissions. When the confidence factor indicates "Collision Detected", the WTRU may choose to retransmit the frame in the uplink (e.g., instead of continuing with the HARQ transmissions, since the first packet transmission may not yield much information when collided at the gNB). The WTRU may determine to switch from scheduled transmissions to autonomous transmissions (e.g., or from autonomous transmissions to scheduled transmissions) based on the confidence factor transmissions.

The gNB may indicate a confidence factor that indicates "Low SNR" or "Additional HARQ Needed" and transmit a NACK with the indication to the particular set of uplink resources, HARQ ID, and/or WTRU IE. Additional resources may be allocated for uplink transmissions for WTRUs that transmitted on the first uplink resources or are associated with the HARQ ID and/or WTRU IE. The WTRU may determine to continue the HARQ transmissions to the gNB on any allocated uplink resources.

K repetition transmissions and acknowledgement for UL configured transmissions may be provided. K repetition transmissions may be used for configured transmission or grant free transmission in uplink (e.g., where a WTRU may transmit K repetitions of a TB). K repetition transmissions may be applied if a WTRU is configured with K resources to transmit a (e.g., a single) TB or a control signal, such as acknowledgement, CSI report, signalings used for initial access, etc. K repetition transmissions may be used at a gNB or WTRU to transmit a (e.g., a single) TB or control signal with K resources. Repetition transmissions may refer to transmissions that correspond to the same set of resource payload bits. The coded bits for each transmission may not be the same. One or more of the below mentioned mechanisms or features may be used for data and/or control transmissions with one or more allocated resources (e.g., the data and/or control signals may be transmitted with one or more allocated resources).

COT-based K repetition transmissions may be used (e.g., within a COT). A periodicity P for uplink transmission without grant may be set to the COT duration. The assignment of P may be predefined in an NR-U band or may be configurable (e.g., by using higher layer signaling).

Figure 10:
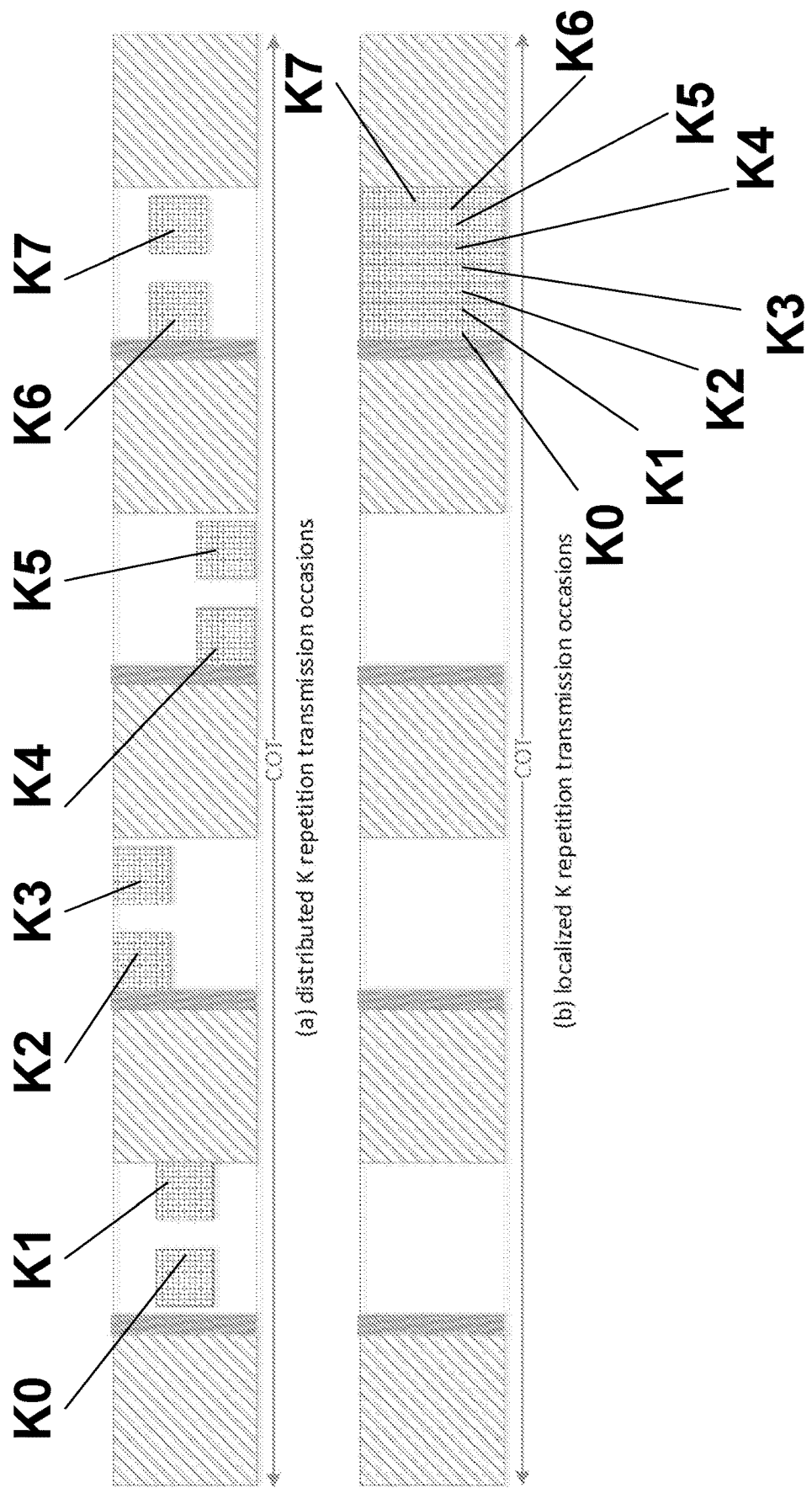
FIG. 10 shows an example of resource allocations for repetition transmissions in a COT.

An example of one or more (e.g., two) COT based K repetition transmissions may be shown in FIG. 10. FIG. 10 shows an example of a distributed K repetition transmission. In a distributed K repetition transmission, K repetition transmission occasions may be scheduled/allocated in a distributed way in UL transmission durations. A gNB may transmit DCI or another type of implicit or explicit HARQ-ACK for early termination of the K repetition transmissions. The K repetition resource allocation may use any of the following rules (e.g., to maintain continuous transmission within the COT). In a carrier (e.g., each carrier), a partial frequency band may be allocated to grant-free transmission, and the rest of the frequency band may be allocated to grant-based transmission. If the entire frequency band in a carrier is allocated to a grant-free transmission, the time duration allocated for the grant free transmission may be relatively small (e.g., smaller than a distributed coordination function (DCF) interframe spacing (DIFS) (e.g., 25 us) for a WiFi system so that a WiFi STA may not be able to acquire the media).

Localized K repetition transmissions may be used. An example of localized K repetition transmissions may be shown in FIG. 10. K repetition transmission occasions may be scheduled/allocated in a localized way in UL transmission durations. The localized K repetition transmission occasions may be at the end of a COT. If a WTRU does not have traffic to transmit in a grant-free section, or is not able to transmit due to LBT failure, the WTRU may not transmit on the allocated resources. In an unlicensed band, one or more the resources may be reserved by a gNB. A WTRU that misses the gNB reservation or does not understand the gNB reservation may attempt to transmit on the reserved resources. By allocating the transmission occasions at the end of the COT, if a channel is occupied by other WTRUs, the transmissions on the rest of COT may not be impacted.

WTRUs that have a grant-free (GF) configuration and/or valid uplink traffic may transmit. There may be a chance that transmissions from different WTRUs collide. The gNB may (e.g., to reduce the collision probability) perform one or more of the following. The gNB may schedule more transmission occasions for GF transmission. A WTRU (e.g., each WTRU) that has received a GF configuration may have a WTRU specific configuration for the number of repetitions that the WTRU may perform. For example, the number of transmission occasions for GF may be more than a maximum number of repetitions among the WTRUs. The gNB may adjust the number of repetitions that were configured for a WTRU (e.g., based on the number of WTRUs that are configured for GF transmission). For example, the gNB may assign a smaller number of repetitions for a WTRU (e.g., each WTRU) if there is a large number of WTRUs that are expected to perform GF transmission. The gNB may assign a larger number of repetitions for a WTRU (e.g., each WTRU) if there is a small number of WTRUs that are expected to perform GF transmission.

Figure 11:
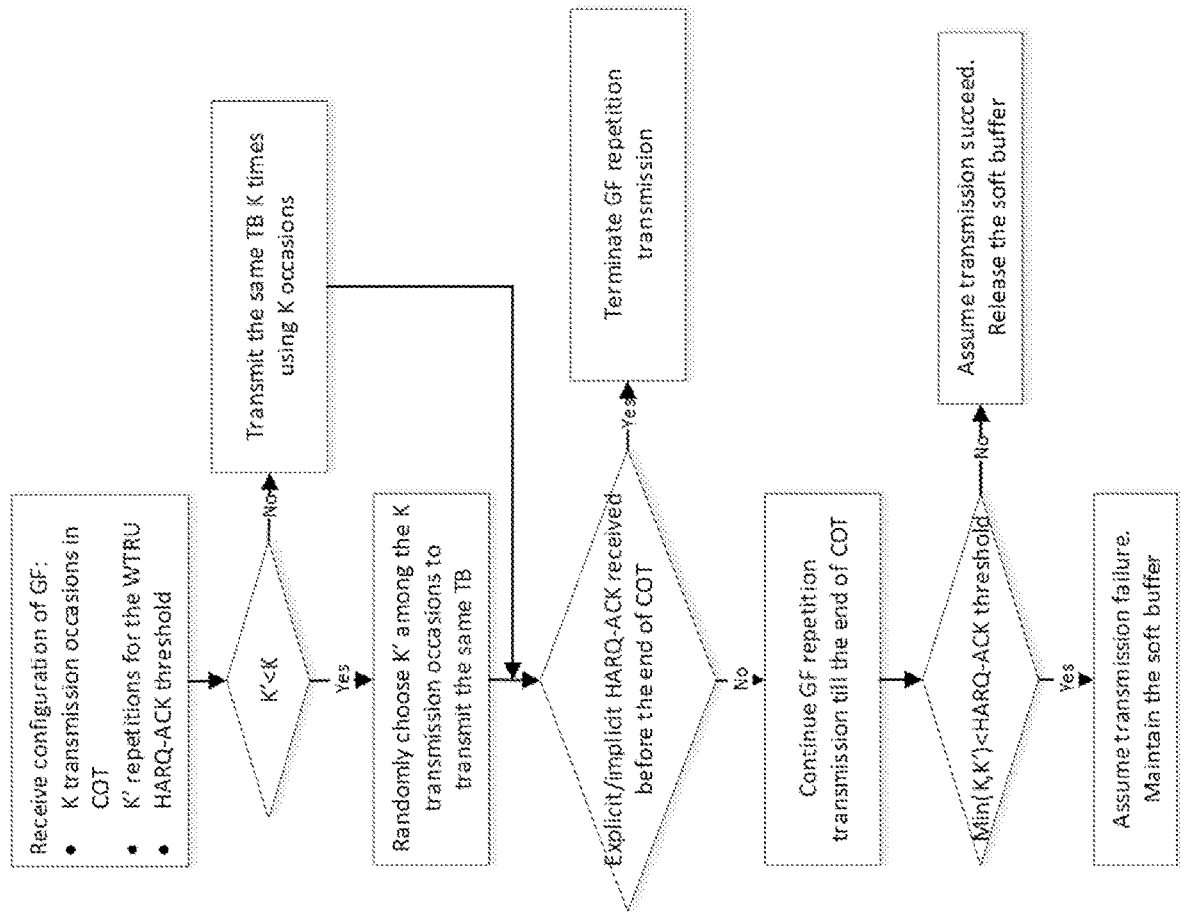
FIG. 11 shows an example of a WTRU using COT based UL GF repetition transmissions and acknowledgments.

A WTRU may receive configurations from a gNB including one or more of the following. One or more of the configurations may be transmitted at the beginning of the COT as COT setting configurations (e.g., in CFS). One or more of the configurations may be transmitted with WTRU specific configurations. The configurations may be COT-specific or valid. The configurations may be updated at a later time. FIG. 11 shows an example of a WTRU technique for COT-based UL GF repetition transmissions and acknowledgements.

K transmission occasions for grant-free transmission in a COT may be used. K transmission occasions may be allocated for grant-free transmission in a COT (e.g., a per-COT configuration).

K' repetitions for the WTRU may be used. The WTRU may be allowed to transmit K' repetitions of a TB (e.g., a per-COT configuration).

A GF HARQ-ACK threshold and/or a HARQ-ACK timer may be signaled or predefined. A GF HARQ-ACK threshold may be defined in a unit of UL transmission. The WTRU may (e.g., implicitly) determine that the repetition transmissions succeeded if the WTRU performs K' repetition transmissions in a COT and K' is greater than the GF HARQ-ACK threshold when the WTRU does not receive an acknowledgement from the gNB. If K' is smaller than the threshold, the WTRU may determine that the repetition transmissions failed. The threshold may be predefined/predetermined and/or configurable. For example, a configurable threshold may be signaled or configured by gNB in a per-COT fashion.

A GF HARQ-ACK timer may be used. With COT-based K repetition transmissions, the timer may be set to the duration of the COT. The timer may be set to a summation of multiple COTs. For example, the timer may be set to 3, which may be a total duration of three consecutive COTs the WTRU is involved with from the reception of the GF HARQ-ACK timer. The WTRU may determine that the GF repetition transmission was successful if the timer expires and no acknowledgement is received.

The WTRU may compare K' with K. If K'<K, the WTRU may randomly choose K' from among the K transmission occasions to transmit a TB. RV values used in the K' repetition may use one or more of the following. RV sequences may be assigned on K transmission occasions. The WTRU may use an RV value associated with the transmission occasion if the transmission occasion is selected. For example, 8 transmission occasions (K0, . . . , K7) may be allocated in the COT (e.g., K=8) and the RV sequence may have size I_rv (e.g., I=4). The $n^{th}$ transmission occasion may be associated with the $(mod(n,I\_rv)+1)^{th}$ value in the RV sequence, where n=0, . . . , K−1. For example, if K'=3, the WTRU may randomly choose K0, K3, K5 in which to transmit. For example, N={0, 3, 5}, and the $(mod(n,I\_rv)+1)=\{0,3,1\}^{th}$ value in RV sequence may be used for transmission.

RV values may be associated with a transmission performed by the WTRU. The WTRU may use a $(mod(n-1, I\_rv)+1)^{th}$ value in the RV sequence for its $n^{th}$ transmission, and n=1, 2, . . . , min(K,K'). An RV value used for a transmission may be signaled. For example, the UCI associated with the grant-free transmission may carry the RV value. The WTRU may (e.g., otherwise) transmit a TB K times over the allocated K occasions.

The WTRU may terminate the grant-free repetition transmission if the WTRU receives an explicit or implicit HARQ-ACK before the end of COT.

The WTRU may not receive an explicit or implicit positive HARQ-ACK before the end of the COT. The WTRU may compare the number of fulfilled repetition transmissions (e.g., min (K, K') with GF HARQ-ACK threshold). If min (K, K')<GF HARQ-ACK threshold, the WTRU may determine that the repetition transmissions were not successful. The WTRU may maintain a soft buffer of the TB. If min (K, K') is not less than (e.g., is greater than or equal to) the GF HARQ-ACK threshold, the WTRU may determine that the repetition transmissions were successful. The WTRU may discard the soft buffer of the TB.

FIG. 11 shows an example of a flowchart for that a WTRU may use for COT-based UL GF repetition transmissions and acknowledgements.

Explicit/implicit HARQ-ACK may include one or more of the following. The WTRU may use DCI with the same HARQ process ID as the one used for GF repetition transmissions, and may use a new data indication (NDI) to indicate that a transmission is granted and (e.g., implicitly) that the old GF transmission is positively acknowledged. The NDI may be toggled to indicate that a transmission is for new data. If the NDI is included in DCI for a UL grant, a toggled NDI may indicate that the WTRU needs to transmit new data in the allocated resource. A toggled NDI may imply that a previous data transmission (e.g., an old data transmission) was received correctly. The WTRU may use DCI with the same HARQ process ID as the one used for GF repetition transmissions, and may use toggled NDI to indicate a retransmission is granted and (e.g., implicitly) that the old GF transmission is negatively acknowledged. The WTRU may perform the grant-based retransmission.

gNB determined repetition access may be used. The gNB may determine/choose the transmission occasion if K'<K. The WTRU may receive one or more of the following configurations from gNB. The WTRU may receive K transmission occasions for grant-free transmission in a COT (e.g., K transmission occasions may be allocated for grant-free transmission in the COT). The WTRU may receive K' repetitions for the WTRU (e.g., the WTRU may be allowed to transmit K' repetitions of a TB). A GF HARQ-ACK threshold and/or a HARQ-ACK timer may be signaled or predefined by the gNB. A predetermined UL access may be predefined/predetermined or configured by the gNB. With predetermined UL access, the K' transmission occasions may be selected and/or determined by the gNB. The gNB may signal the selected/determined K' transmission occasions to the WTRU. The WTRU may use the K' occasions to transmit. The gNB may define access implementations in a table, and may assign an index to each entry. The gNB may signal the index to the WTRU. The gNB may define the access type and/or access parameters and signal the type and/or parameters to the WTRU.

Exemplary access techniques are described. In an example (e.g., type 1 or localized access) technique, K' consecutive occasions may be selected for a (e.g., one) WTRU. The gNB may signal the starting occasion offset (K_start) to the WTRU. The localized access may be allocated in a cyclic way. For example, transmission occasion mod(K_start+k_p,K) may be used for UL GF transmissions, where k_p=0, . . . , K'.

In an example (e.g., type 2 or distributed access) technique, K' consecutive occasions with a starting occasion offset (K_start) and step size (K_step) may be selected for a (e.g., one) WTRU. A gNB may signal K_start and K_step to the WTRU. The distributed access may be allocated in a cyclic way. For example, transmission occasion mod (K_start+k_p*K step,K) may be used for UL GF transmissions, where k_p=0, . . . ,K'.

An occasion (e.g., one occasion) may be selected more than once. More than one resource may be selected in that occasion for transmission.

A WTRU may follow the direction of a gNB. For example, the WTRU may perform one or more actions at the direction of the gNB as described herein. A WTRU may use occasions sent by a gNB for GF transmissions.

K repetition transmissions may be used across multiple COTs. A periodicity P for uplink transmission without grant may be set to a duration equal to multiple COTs. Time used for coexisting RAT transmission and LBT may not be counted in the periodicity P. The assignment of P may be predefined in a NR-U band and/or configurable by using higher layer signaling.

A timer may be used. The timer may be, for example, an ACK NRU timer. Expiration of the timer (e.g., implicitly) indicates to the WTRU that the WTRU should determine to use ACK in a licensed band. In an unlicensed band, continuous scheduled transmissions may be possible and the timer may be implemented according to one or more of the following. The timer may begin when the gNB configures the GF transmission to the WTRU. The timer may be suspended when the gNB releases hold of the channel. The timer may be resumed when the gNB acquires the channel again.

A contention window may be adjusted. A WTRU may perform LBT with random backoff before performing uplink transmissions. For example, the WTRU may listen to a channel for a specified duration of time (e.g., associated with a random number selected by the WTRU). The WTRU may transmit if the channel is clear for at least the duration of time. The WTRU may not transmit if the channel is not clear for at least the duration of time.

A WTRU may (e.g. repeatedly) transmit an uplink packet K times before the WTRU receives feedback from the gNB. The WTRU (e.g., for each transmission) may draw a random number uniformly distributed between 0 and CWp, where CWp may be a contention window size (CWS) for priority class p. The WTRU may adjust the CWp for each repetition transmission according to a predefined/predetermined/configured pattern (e.g., a CWS sequence) and its CWp for a previous transmission for priority class p. For example, priority classes may be defined in NR as Channel Access Priority classes.

Figure 12:
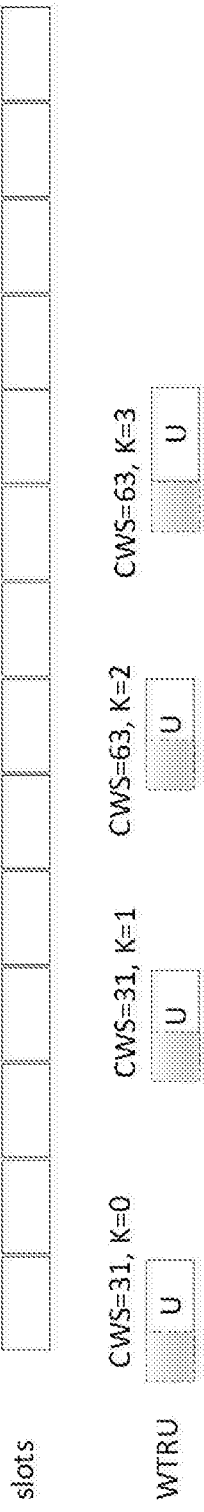
FIG. 12 shows an example of a WTRU driven CWS adaptation with repetition transmissions.

A contention window adjustment example is shown in FIG. 12. The WTRU may transmit a packet one or more (e.g., 4) times. The CWS for the priority class may be 31 for the previous transmission. The WTRU may use the original CWS for first and second transmissions and may increase the CWS for third and fourth transmissions. This set of CWS adjustment patterns may be used for WTRUs with a good channel condition in a dense network (e.g., so that a subset of repetition transmissions may be enough for the gNB to detect the packet). The contention window adjustment used by the WTRU may be configurable by the gNB.

A WTRU may receive configurations for K repetition transmissions (e.g., a set of transmission opportunities). The configuration may include a CWS pattern to be used. A CWS pattern may be defined as a sequence of a CWS adjustments for K repetition transmissions. A CWS for a given transmission may be multiplied by two to the power of a respective CWS adjustment. For example, a sequence pattern C=[0, 0, 1, 1] may be used to indicate that the first two transmissions (e.g., slots as shown in FIG. 12) use the current CWS, and the last two transmissions use a doubled CWS. The sequence pattern C=[0, 0, −1, −1] may be used to indicate that the first two transmissions use the current CWS, and the last two transmissions use a halved CWS (e.g., $2^{-1}=1/2$). The sequence pattern C=[0, 0, 1, 2] may be used to indicate the first two transmissions use the current CWS, the third transmission uses a doubled CWS, and the fourth transmission use a quadrupled (e.g., $2^2=4$) CWS. A list of CWS patterns may be listed in a table and an entry (e.g., each entry) may be assigned a CWS pattern index. By referring to the CWS pattern index, both the gNB and the WTRU may know the corresponding pattern. The CWS pattern may be carried in DCI, which may be used to activate the K repetition transmissions.

In an example, CWp may be the current CWS for the WTRU and the priority class may be p. For the $k^{th}$ transmission, $$CW_p^k = \begin{cases} CW_{min} & CW_p \cdot 2^{C_k} < CW_{min} \\ CW_p \cdot 2^{C_k} & CW_{max} \geq CW_p \cdot 2^{C_k} \geq CW_{min} \\ CW_{max} & CW_p \cdot 2^{C_k} > CW_{max} \end{cases}$$

where $CW_{min}$ may be a minimum CWS and $CW_{max}$ may be a maximum CWS. $CW_{min}$ and/or $CW_{max}$ may be predefined/predetermined or configured by the gNB. C may be the CWS sequence pattern. $C_k$ may be a $k^{th}$ entry in the sequence. The WTRU may generate a random number evenly distributed between 0 and $CW_p^k$ and may perform random backoff based on the random number as described herein.

A gNB may assign a CWS sequence to a WTRU to perform K repetition transmissions. The CWS sequence may be preconfigured or predefined at the WTRU. The WTRU may receive (e.g., from the gNB) a set of K transmission opportunities. The set of K transmission opportunities may span across one or more COTs. The WTRU may receive a CFS for a COT (e.g., as described herein). The CWS sequence may include a CWS for a transmission opportunity (e.g., a respective CWS for each respective transmission opportunity) in the set. A CWS (e.g., each CWS) in the CWS sequence for the WTRU may be unique. The CWS sequence may be assigned to the WTRU based on an identity of the WTRU (e.g., each WTRU may have a unique CWS sequence).

Figure 13:
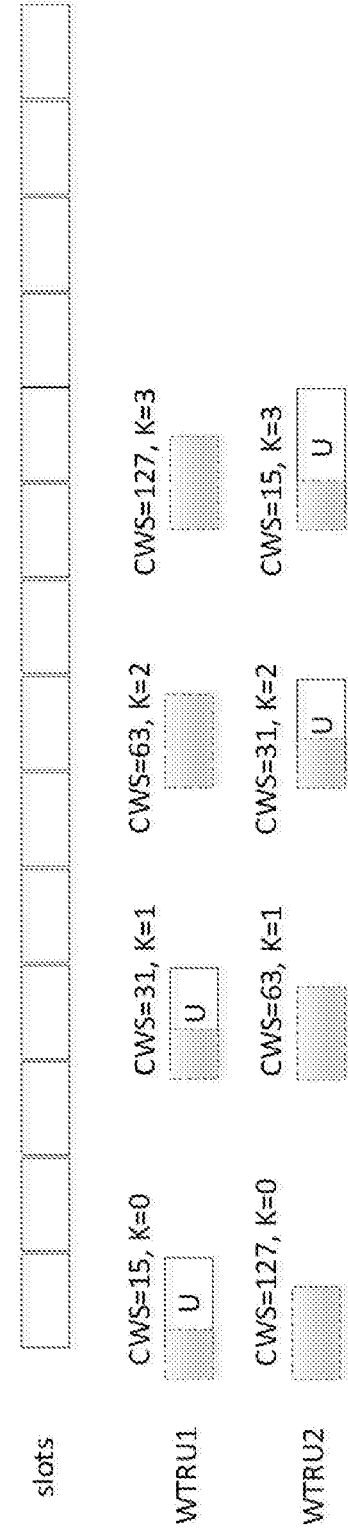
FIG. 13 shows an example of a gNB driven CWS adaptation with repetition transmissions.

The gNB may assign more than one WTRU to transmit over the same set of time/frequency resources (e.g., a channel in an unlicensed band). An example is shown in FIG. 13 in which the gNB may control the CWS. WTRU1 and WTRU2 may be assigned four transmission opportunities (e.g., four slots as shown in FIG. 13) using the same set of time/frequency resources. WTRU1 may be assigned to use CWS sequence CS1=[15, 31, 63, 127], and WTRU2 may be assigned to use CWS sequence CS2=[127, 63, 31, 15]. For a given transmission opportunity, WTRU1 and/or WTRU2 may determine a CWS from their assigned CWS sequence. For the transmission opportunity, each of WTRU1 and WTRU2 may select a (e.g., uniformly distributed) random number between 0 and the respective CWS for that transmission opportunity. Each of WTRU1 and WTRU2 may perform LBT with random backoff based on the selected random number for that WTRU (e.g., as described herein). WTRU1 may have a better chance to transmit over the first two transmission opportunities (e.g., because the CWS for WTRU1 is lower than the CWS for WTRU2 for the first two transmission opportunities), and WTRU2 may have a better chance to transmit over the last two transmission opportunities. The CWS sequence may be carried in an UL K repetition transmission configuration or the DCI, which may be used to activate K repetition transmissions.

For example, WTRU1 and WTRU2 each receive a set of four transmission opportunities (e.g., slots as shown in FIG. 13). WTRU1 and WTRU2 may receive the same set of transmission opportunities and may be configured to transmit over the same set of time/frequency resources. The frequency resource may be a channel in an unlicensed band. The gNB may assign CWS sequence CS1=[15, 31, 63, 127] to WTRU1 and CWS sequence CS2=[127, 63, 31, 15]. The CWS sequence for each WTRU may be determined based on an identity of the WTRU. For a first transmission opportunity in the set, each of WTRU1 and WTRU2 may determine a respective CWS based on the CWS sequence for that WTRU. For example, WTRU1 may determine that its CWS for the first transmission opportunity is 15, while WTRU2 may determine that its CWS for the first transmission opportunity is 127. Each of WTRU1 and WTRU2 may select a (e.g., evenly distributed) random number between 0 and its determined CWS. For example, WTRU1 may select the random number 12 and WTRU2 may select the random number 60. Each of WTRU1 and WTRU2 may listen to the channel for a duration of time associated with its selected random number. For example, WTRU1 may listen to the channel for 12 backoff slots and WTRU2 may listen to the channel for 60 backoff slots. The length of a backoff slot may be predefined or preconfigured. At the $12^{th}$ backoff slot, WTRU1 may determine that the channel is clear and may begin transmission (e.g., of a data packet). WTRU2 may detect channel busy starting from the $12^{th}$ backoff slot and may not transmit in the transmission opportunity.

A contention window size may be adjusted based on a WTRU index. A CWS may be a function of transmission occasion index k and WTRU index j. A WTRU (e.g., each WTRU) may need to know its WTRU index. The WTRU index may be assigned (e.g., signaled) by a gNB, e.g., explicitly. For example, the gNB may include the WTRU index in RRC signaling or L1 signaling for the WTRU. The WTRU index may be indicated by a limited number of bits, e.g., 4 bits. The gNB may group WTRUs that share fully or partially overlapped resources for control/data autonomous transmission together and use a unique WTRU index within the group. WTRUs in a different group may reuse the WTRU index. For example, within a group, each WTRU may have its WTRU index which may be unique within the group. A WTRU in a different group may use the same WTRU index, for example if WTRU indices are limited. In examples, WTRUs from different groups may not use fully or partially overlapped resources for autonomous transmission.

The WTRU index may be implicitly signaled. For example, the WTRU index may be derived from a WTRU RNTI or other WTRU specific identity. For example, the WTRU and the gNB may know the WTRU index once the WTRU identity is known.

The gNB may indicate the number of WTRUs in the group, for example in the RRC or L1 signaling. The WTRU may know the number of WTRUs that share the allocated resource. This information may help the WTRU to properly choose a multiple access mechanism to share the resource with other WTRUs. For example, the WTRU may choose a multiple access mechanism based on the number of WTRUs that share the allocated resource.

A contention window size may be adjusted based on a subset index, a partition index, and/or a repetition index. For example, there may be K repetitions for transmission. The K repetitions may be segmented into M subsets for transmission. A subset (e.g., each subset) may be further segmented into N partitions for transmission. Within a transmission partition (e.g., each transmission partition), there may be J repetitions for transmission. A transmission subset may be assigned an index, e.g., subset index m. A transmission partition may be assigned an index, e.g., partition index n. Repetition may be assigned an index, e.g., repetition index k.

A WTRU may use a first LBT category for a first transmission subset and may use a second LBT category for a second transmission subset. The first and the second LBT categories may be the same or different. The LBT categories may be configured or indicated by gNB. Within a transmission subset (e.g., each transmission subset) the WTRU may use a first priority access class associated with the LBT category for a first transmission partition in the subset and use a second priority access class associated with the LBT category for a second transmission partition in the subset. Within a transmission partition (e.g., each transmission partition) the WTRU may use a first CWS for a first repetition transmission and use a second CWS for a second repetition transmission in the transmission partition. The number of subsets M and the number of partitions N in a subset may be configured or indicated. M and N may be one or larger than one.

For example, there may be K=8 repetition transmissions, where one or more (e.g., two) subsets may be used. The first subset may employ category 4 LBT while the second subset may employ category 2 LBT. There may be two transmission partitions in the first subset. For the first partition, the WTRU may use a low priority access class, while the WTRU may use a higher priority access class for the second partition. There may be two repetition transmissions in a partition (e.g., each partition). The WTRU may use a small CWS for the first repetition and a large CWS for the second repetition in the partition.

For example, there may be K=8 repetition transmissions, where a (e.g., a single) subset may be used. The subset may employ category 4 LBT. There may be two transmission partitions in the first subset. For the first partition, the WTRU may use a low priority access class, while the WTRU may use a higher priority access class for the second partition. There may be four repetition transmissions in a partition (e.g., each partition). The WTRU may use one CWS for the first repetition, one CWS for the second repetition, another CWS for the third repetition and yet another CWS for the fourth repetition in the partition.

Figure 15:
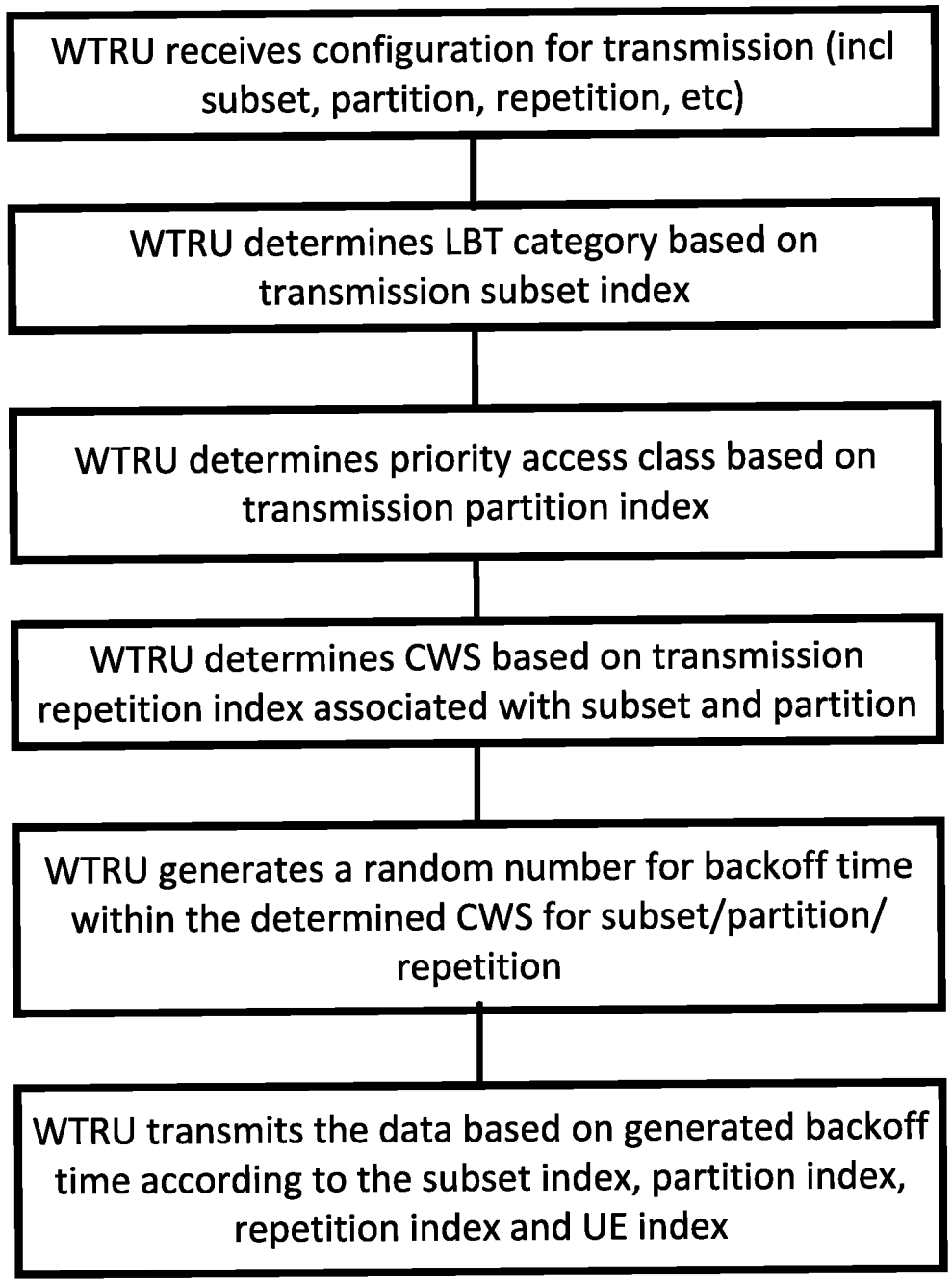
FIG. 15 illustrates an example contention window adjustment based on subset index, partition index and repetition index.

FIG. 15 illustrates an example contention window adjustment based on a subset index, a partition index and a repetition index. A WTRU may receive configuration information for a transmission which may include a configuration for a transmission subset, a partition, and/or a repetition, etc. The WTRU may receive association information for an LBT category, a priority access class and a CWS with a subset index, a partition index within the subset, and/or a repetition index within the partition. The WTRU may determine an LBT category (e.g., based on the transmission subset index), for example if the transmission subset, partition, repetition are known to the WTRU. The WTRU may determine the priority access class (e.g., based on the transmission partition index), for example if the WTRU determines the LBT category associated with a subset. The WTRU may determine a CWS based on the transmission repetition index. The WTRU may generate a random number for a backoff time within the determined CWS. The WTRU may transmit the data based on the generated backoff time according to the subset index, partition index, repetition index, and WTRU index.

In examples, a WTRU may use different CWSs for different transmission subsets. Within a subset (e.g., each subset) a CWS may be the same for transmission partitions and repetitions. For example, the WTRU may use a small CWS for subset 1 and large CWS for subset 2 (e.g., or vice versa). A different CWS may be used for different transmission partitions. As an example, the WTRU may use a small CWS for transmission partition 1 and a large CWS for transmission partition 2 (e.g., or vice versa). Within a transmission partition (e.g., each transmission partition), the same CWS may be used for the repetitions within that transmission partition, but different CWSs may be used for repetitions across transmission partitions. Other combinations for CWS with transmission subsets, partitions, and repetitions may be used.

Multi user power division repetition transmissions may be used. Multiple access with K repetition transmissions may be used. Transmit power may be adjusted per WTRU per transmission (e.g., such that receive power ratios between multiple WTRUs at the gNB side are controlled, for example as shown in FIG. 13). As shown in FIG. 13, 4 repetition transmissions may be used. WTRU1 and WTRU2 may be assigned different transmit powers for each transmission. WTRU1 may be assigned transmit power $P_1=[P_1^1, P_1^2, P_1^3, P_1^4]$ for the 4 transmissions, where $P_1^1 > P_1^2 > P_1^3 > P_1^4$. WTRU2 may be assigned transmit power $[P_2^1, P_2^2, P_2^3, P_2^4]$ for the 4 transmissions, where $P_2^1 < P_2^2 < P_2^3 < P_2^4$. At the gNB side, the received power ratios between the two WTRUs may be varied for each repetition time. A gNB may use soft cancellation detection and/or iterative detection to improve the detection/decoding performance.

A WTRU may receive a configuration for K repetition transmissions. The configuration may include a transmit power adjustment pattern (TPAP) to be used. A TPAP may be defined as a sequence of transmit power adjustments based on the baseline power for K repetition transmissions. For example, TPAP=[0, 0, 1, 1] may be used to indicate that the first two transmissions use the current transmit power or the baseline transmit power that the WTRU may use, and the last two transmissions use transmit power increased by one step size. The transmit power used may be $[P_0, P_0, P_0+\Delta P, P_0+\Delta P]$, where $P_0$ may be the baseline transmit power to be used by the WTRU. In an example, for 4 repetition transmissions and TPAP=$[m_1, m_2, m_3, m_4]$, the corresponding transmit power to be used may be $[P_0+m_1\Delta P, P_0+m_2\Delta P, P_0+m_3\Delta P, P_0+m_4\Delta P]$. $m_k$ may be a positive or negative number for a $k^{th}$ repetition transmission. A list of possible TPAPs may be listed in a table. An entry (e.g., each entry) may be assigned a TPAP index. By referring to the TPAP index, the gNB and the WTRU may know the corresponding transmit power pattern. The TPAP may be carried in the DCI, which may be used to activate the K repetition transmissions.

Figure 14:
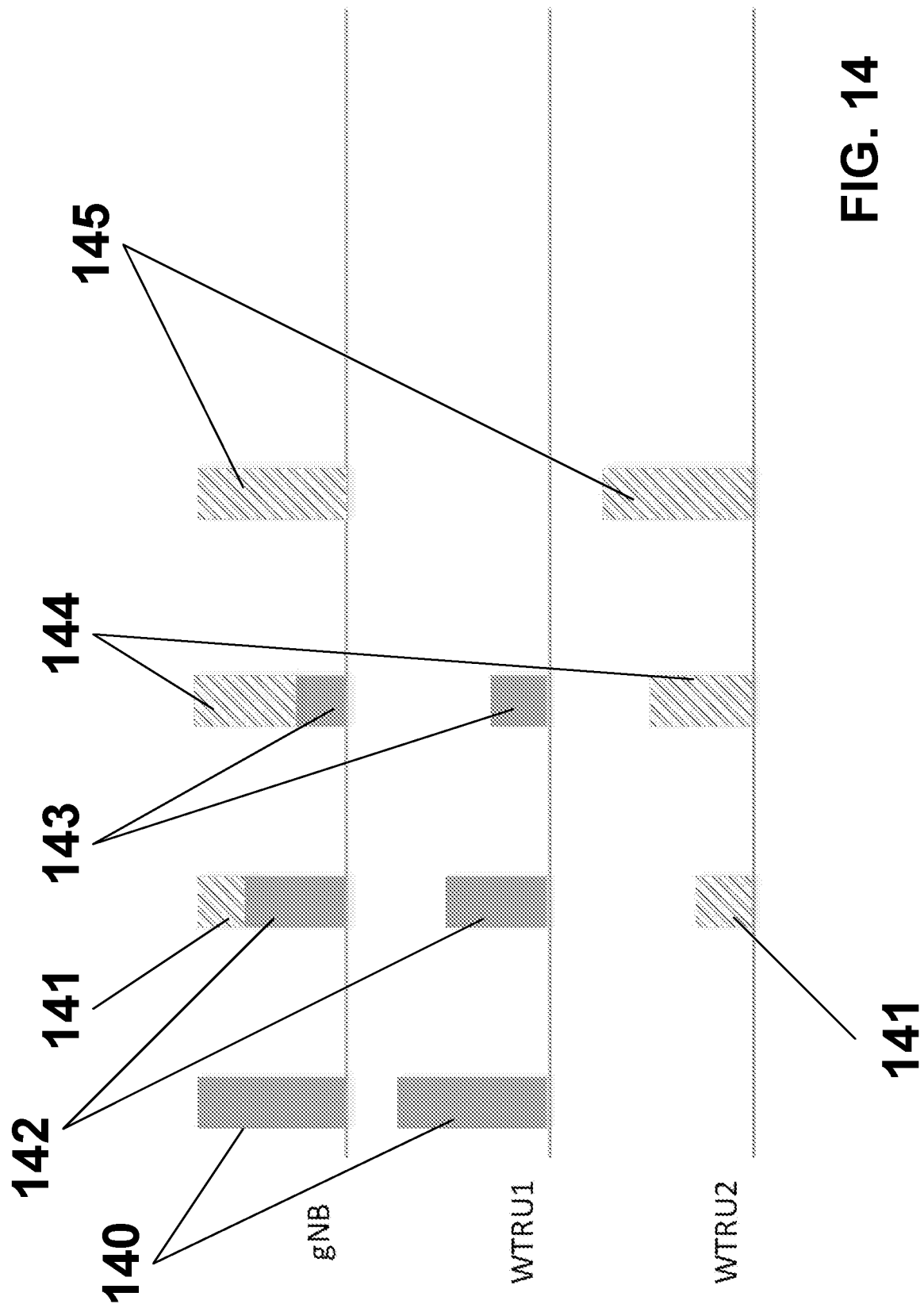
FIG. 14 shows an example of multi user power division repetition transmissions.

For a kth transmission, the WTRU may transmit the packet using the assigned transmit power. FIG. 14 shows an example of multi user power division repetition transmissions. As shown in FIG. 14, the gNB may assign transmit power 140 to WTRU1, transmit power 141 to WTRU 2 and transmit power 142 to WTRU1, transmit power 144 to WTRU 2 and transmit power 143 to WTRU1, and transmit power 145 to WTRU2. As shown in FIG. 14, WTRU1 and WTRU2 may be transmitting concurrently 4 times using the same resource. The gNB is the receiver (e.g., as shown in FIG. 14, the gNB may detect power levels from the two WTRUs). Each time, the gNB may receive the combined signal with different power ratios from each WTRU. In a time slot (e.g., a first time slot), WTRU1 may transmit using full power and WTRU2 may not transmit. The gNB may know the transmission is from WTRU1. In a time slot (e.g., a second time slot), WTRU1 may use ¾ power and WTRU2 may use ¼ power, such that the gNB may perform a receiving implementation to first decode transmission from WTRU1 and then get information from WTRU2. The process may be repeated until the gNB successfully decodes all transmissions.

The transmit power for a particular k transmission in K repetitions may be based on a particular value of K and/or based on HARQ ACK or NACK. In an example, a transmit power for a K repetition may be inversely proportional to the value K. If K is large, the transmit power may be lower than when K is small. A transmission (e.g., each transmission) of the K repetitions may increase in power. If a WTRU has received a K repetition assignment and a HARQ ACK is received before a K repetition has been completed, the WTRU may use a lower transmit power for the next K repetition transmissions. The HARQ ACK or NACK may include a transmit power or a K value adjustment. For example, a HARQ ACK may include a new K value for the next K repetition assignment and/or a transmit power. The transmit power values and/or K values may be for the same resources. The WTRU may use the included K value and the transmit power for the next K repetition transmissions. A HARQ NACK may imply that the WTRU may use higher transmit power for the next transmission of the K repetition. A HARQ NACK may also include transmit power indications for the WTRU (e.g., so that the WTRU may use the transmit power assignment). A HARQ NACK may include a new K value for the current or next K transmissions. The WTRU may use the new K value to continue the current K transmission (e.g., K may be reset at the reception of the HARQ NACK) or for the next K transmissions. A HARQ ACK/NACK may include a resource assignment for the WTRU (e.g., so that the WTRU may use a less crowded resource for the next or remaining transmissions in the K repetition).

A timing offset indication for non-stand alone NR-U resource assignment may be used.

For non-standalone NR-U devices, resource assignment and/or DCI may be provided to the devices on the licensed band. Resource assignment and/or DCI may be indicated in terms of a common time reference point (e.g., since the gNB cannot predict when it may obtain medium access on the unlicensed band). Resources may be allocated using a particular reference time, Tr, which may be one or more of the following. The reference time may be the time at which the gNB obtains the wireless medium, which may be through LBT. The reference time may be the time of the start of the first valid subframe after the gNB has obtained the wireless medium. The reference time may be the time at which the gNB transmits a common signal over the wireless medium to announce obtaining the medium after it has obtained the wireless medium. The reference time may be the time that the gNB considers as the Tr, which may be the time it has obtained the medium. The gNB may announce the reference time on the unlicensed band or licensed band.

Resource allocation and DCI may include an offset time, Toffset, which may be the offset from the Tr at which the WTRU may be assigned UL and/or DL slots and/or control or data transmission/receptions.

A WTRU may receive a resource allocation/DCI through the licensed band. A resource allocation/DCI may include one or more of Tr and/or Toffset. The WTRU may monitor the unlicensed band for gNB activities. The WTRU may start a timer and/or determine the UL/DL data/control resource allocation/DCI assigned to itself if the WTRU observes that the gNB has obtained the medium (e.g., by observing a common signal, the start of a valid subframe, and/or the Tr that has been announced by the gNB on the licensed or unlicensed band). The WTRU may start to transmit/receive on the assigned UL/DL data/control resource/DCI assigned to itself.

One or more WTRU multiplexing mechanisms may be implemented.

If more than one WTRU share resources, the WTRU may use WTRU-specific resource mapping. In examples, for a given resource, the WTRU may choose a coding rate such that the WTRU occupies part of the allocated resource. Based on a channel condition, the WTRU may choose to use modulation order k and coding rate m. With repetition transmission, the WTRU may be able to use a higher order of modulation or coding rate. The WTRU may expect the gNB to be able to fully recover the received signal after reception of several repetitions. For a transmission (e.g., each transmission), the WTRU may be able to occupy a smaller number of resource elements. Other WTRUs may use the rest of the resource element, which may reduce interference.

Figure 16:
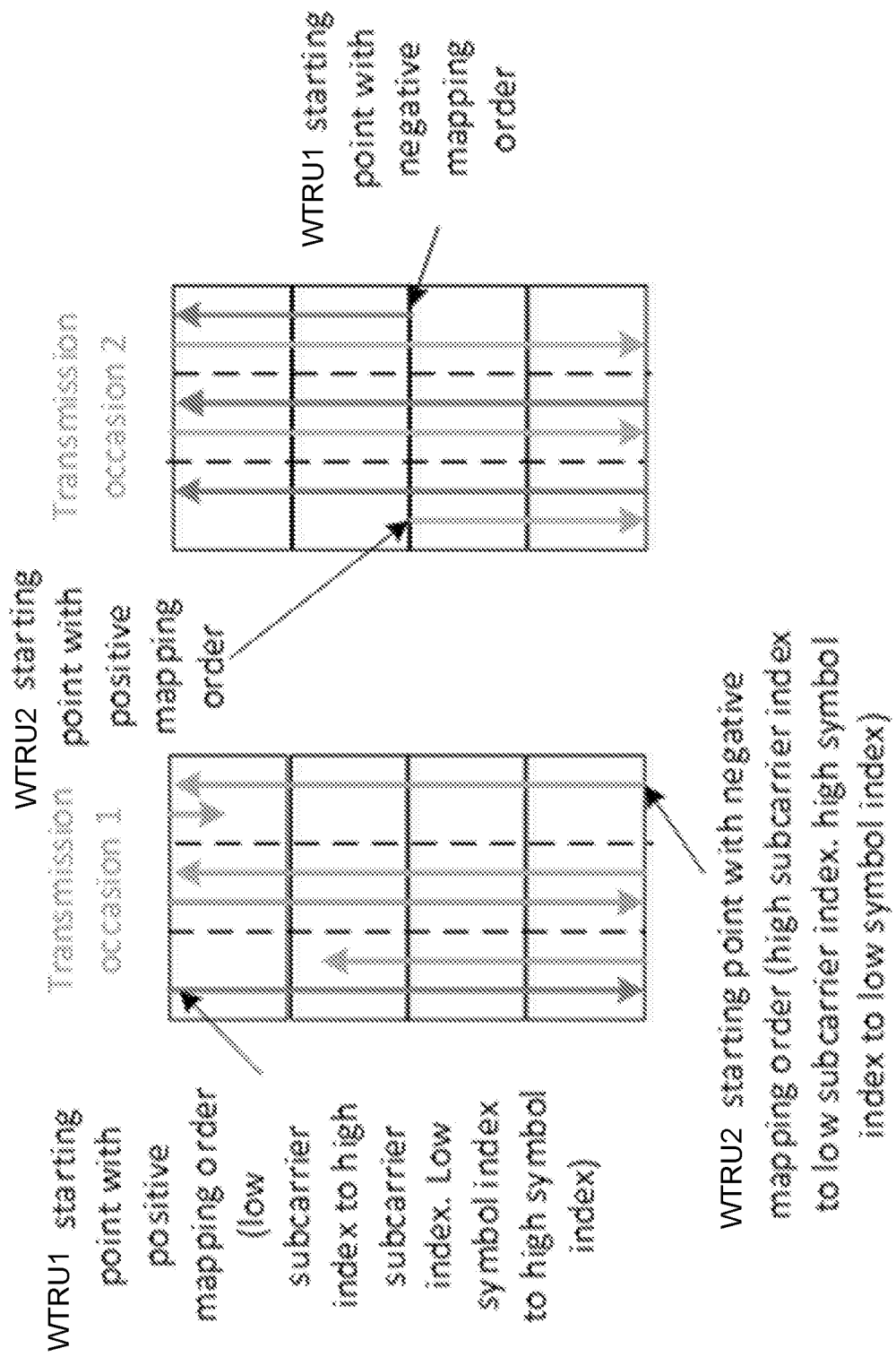
FIG. 16 shows a resource mapping mechanism.

FIG. 16 shows an example resource mapping mechanism. In the example of FIG. 16, WTRU1 and WTRU2 may use the same time frequency resources for a first transmission and a second transmission of a packet. For a transmission occasion (e.g., each transmission occasion), a WTRU (e.g., each WTRU) may be assigned a starting point and resource mapping order. The starting point may be assigned and/or determined. The resource mapping order may be assigned and/or determined. The starting point may be the location that a WTRU uses as a starting point to insert its modulated symbols. The resource mapping order may be the order a WTRU uses to map its modulated symbols to the virtual resource blocks. For example, one or more of the following orders may be explicitly or implicitly utilized: from low subcarrier index to high subcarrier index and from low symbol index to high symbol index; from high subcarrier index to low subcarrier index and from low symbol index to high symbol index; from low subcarrier index to high subcarrier index and from high symbol index to low symbol index; or from high subcarrier index to low subcarrier index and from high symbol index to low symbol index. One or more mapping mechanisms may be available. For example, mapping through frequency may be performed first before time, or vice versa.

The starting point and resource mapping order may depend on the transmission occasion index. For example, they may be different from transmission occasion k to transmission occasion j if k≠j.

Figure 17:
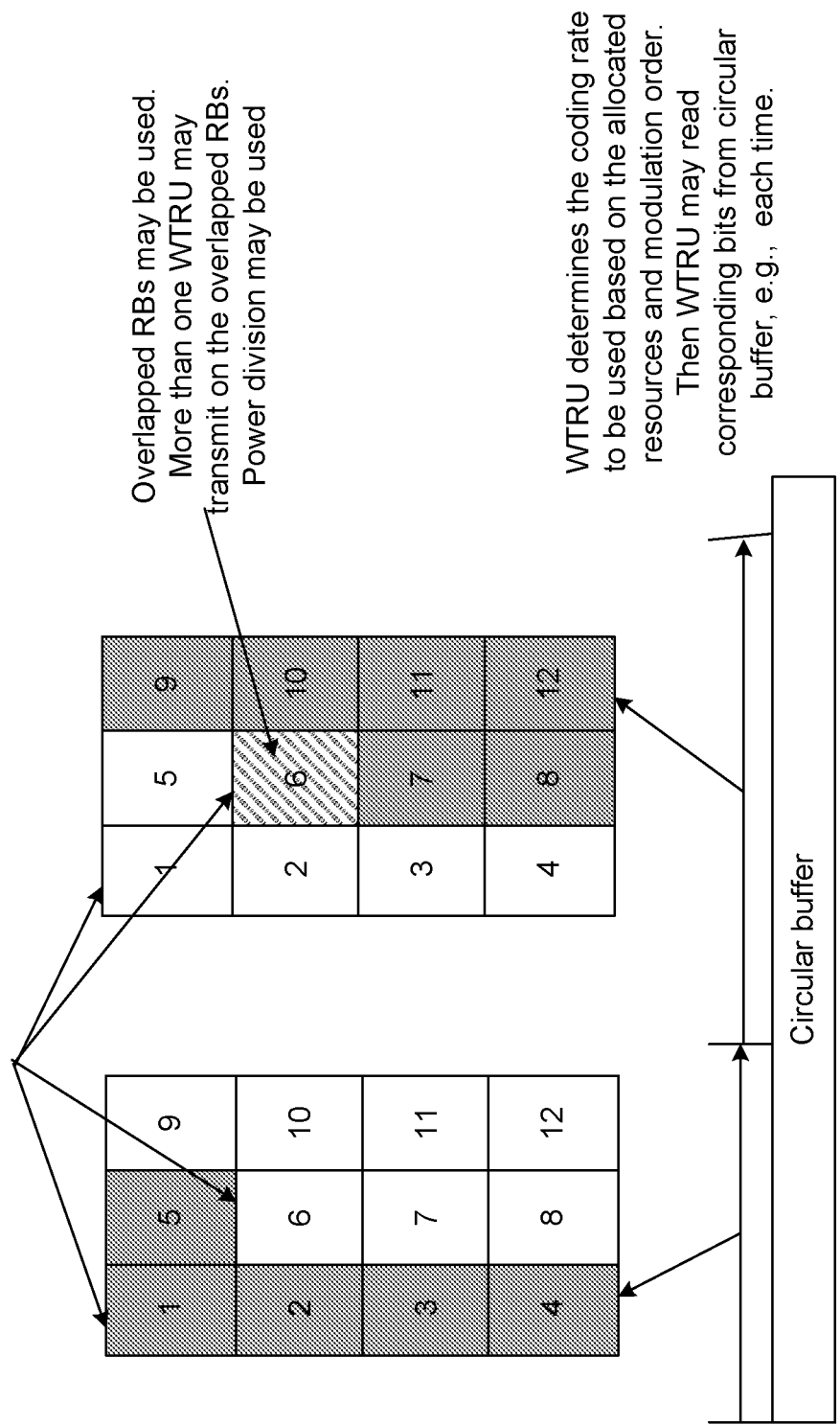
FIG. 17 shows a resource mapping mechanism.

FIG. 17 shows an example resource mapping mechanism. In the example of FIG. 17, the mapping may be virtual resource block based. For example, in transmission occasion 1 and transmission occasion 2, 12 resource blocks may be allocated and 2 WTRUs may be expected to share the resources. A WTRU (e.g., each WTRU) may be assigned a starting RB and a number of assigned RBs. These assignments may be transmission occasion index specific. For example, there may be two WTRUs, WTRU1 and WTRU2. For a transmission occasion (e.g., the first transmission occasion), the starting RB for WTRU1 may be 1 and the starting RB for WTRU2 may be 6. WTRU1 may have 5 RBs and WTRU2 may have 7 RBs. For a transmission occasion (e.g., the second transmission occasion), the starting RB for WTRU1 may be 6 and the starting RB for WTRU2 may be 1. WTRU1 may have 7 RBs and WTRU2 may have 6 RBs. The WTRU may determine its coding rate based on the number of RBs and modulation order it may use, e.g., once a WTRU receives this assignment. The WTRU may read the corresponding number of coded bits from a circular buffer.

The resource allocations to the WTRUs may be overlapping. In the example shown in FIG. 17, RB6 (e.g., in the second transmission occasion) may be an overlapped RB. The gNB may signal WTRUs the location of the overlapped RB explicitly or implicitly. The gNB may signal the number of WTRUs expected to share the same resources. The WTRU, which may notice the overlapped resources, may adjust its transmit power on the overlapped resources. For example, when one or more (e.g., two) WTRUs are expected to share the overlapped resources, a WTRU (e.g., each WTRU) may use a predefined transmit power pattern on the overlapped RBs. The gNB may receive the transmissions from multiple WTRUs and use the received information on non-overlapped RBs to help recover the information on overlapped RBs.

One or more enhanced CWS adjustment mechanisms for CBG based transmissions may be provided. With CBG level transmissions, a TB may have one or more CBGs, and a CBG (e.g., each CBG) may have its own acknowledgement bit. TB level acknowledgement and CBG level acknowledgements may be expected to be received together.

A contention window size adjustment mechanism for CBG level transmission may include one or more of the following. If a TB level acknowledgement is positive and CBG level acknowledgements (e.g., all CBG level acknowledgements) are positive, the CWS may reset to CWSmin and the TB may be treated as successfully received. If a TB level acknowledgement is negative and CBG level acknowledgements (e.g., all CBG level acknowledgements) are negative, the CWS may set to min(CWSmax, 2CWS) and the TB may be treated as corrupted. If a TB level acknowledgement is negative and at least one CBG acknowledgement is positive, the CWS may remain the same, reset to CWSmin, be set to min(CWSmax, 2CWS) or be set to a next level and the TB may be treated as successfully received or corrupted. In examples, CWS values may be adjusted as disclosed herein. In examples, the treated TB values may be used to adjust the CWS.

A certain threshold may be predefined or predetermined or signalled by the gNB. The threshold may be a percentage value. If the number of positive CBGs divided by the number of total CBGs is greater than the threshold, the CWS may be reset to a minimum value. Otherwise, the CWS may increase to the next level (e.g., unless it reaches the maximum value). The number of total CBGs may refer to the number of total CBGs actually carried in the PDSCH. The number of total CBGs may refer to the maximum number of CBGs that can be carried. If more than one TB is carried by a subframe or a slot with the same access priority, the above-mentioned ratio may be calculated over the entire subframe or slot (e.g., ratio=number of positive CBGs per slot divided by number of total CBGs per slot).

The CWS behavior may be based on additional feedback from the receiver (e.g., the WTRU or gNB) or autonomous decisions made by the transmitter (e.g., the gNB or WTRU). The receiver, on decoding the transport block (e.g., made up of CBGs) may be able to determine if the CBG failures were caused by collisions from other transmissions in the medium or from a change in the SNR due to channel fading. The receiver may estimate one or more parameters, for example the SINR, the SNR, and the presence of a change in the SNR in the packet. In examples, if there is an increase in the number of CBG errors accompanied by a drop in RSSI, the receiver may assume that there is a fading channel. In examples, if there is an increase in the number of CBG errors accompanied by an increase in the RSSI, the receiver may assume that there is a collision.

Figure 18:
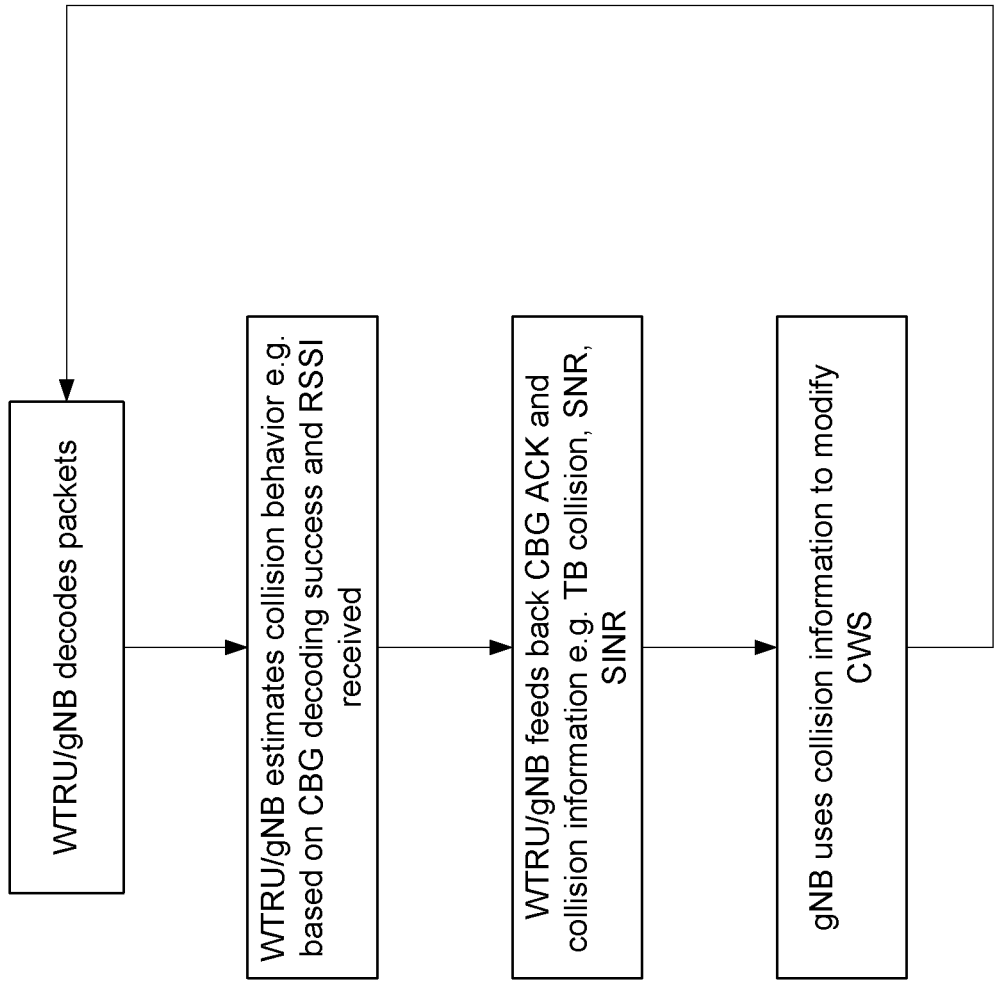
FIG. 18 illustrates an example receiver assisted CWS adjustment.

In receiver assisted CWS adjustment (e.g., as shown in FIG. 18), the receiver may send feedback (e.g., a collision indicator) to the transmitter, which may be in addition to the CBG-based ACK information. The transmitter may not change the CWS if the collision indicator indicates a low SNR. The transmitter may change the CWS (e.g., to min (CWSmax, 2CWS)) if the collision indicator indicates a collision. In a receiver assisted CWS adjustment (e.g., as shown in FIG. 18), the receiver may send feedback (e.g., SNR, SINR, RSSI) to the transmitter, which may be in addition to the CBG-based ACK information, and the transmitter may use this information to decide if there is a collision or not and may act accordingly. The receiver may send back the CBG-based ACK (e.g., only the CBG-based ACK) and the transmitter may autonomously estimate whether there was a collision or not based on the CBG ACK properties. In examples, the transmitter may set a CBG ACK number threshold above or equal to which it may modify the CWS, and below which it may keep the CWS constant.

FIG. 18 illustrates an example receiver assisted CWS adjustment.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

Although the features and elements may be described herein in particular combinations, each feature or element may be used alone, without the other features and elements, and/or in various combinations with or without other features and elements.

Although the solutions described herein consider New Radio (NR), 5G or LTE, LTE-A specific protocols, it is understood that the solutions described herein are not restricted to this scenario and are applicable to other wireless systems as well.

What is claimed:

1. A wireless transmit/receive unit (WTRU) comprising:
a processor configured to:
receive configuration information associated with a set of transmission opportunities;
determine a contention window size (CWS) sequence indicating a respective CWS for each respective transmission opportunity in the set of transmission opportunities;
determine a CWS associated with a transmission opportunity in the set of transmission opportunities based on the CWS sequence;
select a random number between zero and the CWS associated with the transmission opportunity;
determine whether a channel is clear for a duration of time associated with the random number; and
on a condition that the channel is clear for the duration of time associated with the random number, transmit a signal in the transmission opportunity.

2. The WTRU of claim 1, wherein the signal comprises one of a physical uplink control channel (PUCCH) transmission or a physical uplink shared channel (PUSCH) transmission.

3. The WTRU of claim 1, wherein to determine the CWS sequence, the processor is configured to receive the CWS sequence from a network device.

4. The WTRU of claim 1, wherein the CWS sequence is preconfigured in the WTRU.

5. The WTRU of claim 1, wherein each CWS in the CWS sequence is unique.

6. The WTRU of claim 1, wherein on a condition that the channel is not clear for the duration of time associated with the random number, the processor is further configured to not transmit the signal in the transmission opportunity.

7. The WTRU of claim 1, wherein the set of transmission opportunities spans across two or more channel occupation times (COTs).

8. The WTRU of claim 7, wherein the processor is further configured to receive a COT format frame signal (CFS) comprising COT configuration information for a COT.

9. The WTRU of claim 8, wherein the COT configuration information comprises one or more of a duration of the COT, a number of downlink/uplink switches in the COT, a number of uplink/downlink switches in the COT, a first number of downlink (DL) orthogonal frequency-division multiplexing (OFDM) symbols, a number of uplink (UL) OFDM symbols, or a second number of DL OFDM symbols.

10. A method implemented in a WTRU, the method comprising:

receiving configuration information associated with set of transmission opportunities;

determining a contention window size (CWS) sequence indicating a respective CWS for each respective transmission opportunity in the set of transmission opportunities;

determining a CWS associated with a transmission opportunity in the set of transmission opportunities based on the CWS sequence;

selecting a random number between zero and the CWS associated with the transmission opportunity;

determining whether a channel is clear for a duration of time associated with the random number; and on a condition that the channel is clear for the duration of time associated with the random number, transmitting a signal in the transmission opportunity.

11. The method of claim 10, wherein the signal comprises one of a physical uplink control channel (PUCCH) transmission or a physical uplink shared channel (PUSCH) transmission.

12. The method of claim 10, wherein determining the CWS sequence comprises receiving the CWS sequence from a network device.

13. The method of claim 10, wherein the CWS sequence is preconfigured, and wherein each CWS in the CWS sequence is unique.

14. The method of claim 10, further comprising on a condition that the channel is not clear for the duration of time associated with the random number, not transmitting the signal in the transmission opportunity.

15. The method of claim 10, further comprising receiving a channel occupation times (COT) format frame signal (CFS) comprising COT configuration information for a COT, wherein the COT configuration information comprises one or more of a duration of the COT, a number of downlink/uplink switches in the COT, a number of uplink/downlink switches in the COT, a first number of downlink (DL) orthogonal frequency-division multiplexing (OFDM) symbols, a number of uplink (UL) OFDM symbols, or a second number of DL OFDM symbols, and wherein the set of transmission opportunities spans across two or more COTs.

16. The WTRU of claim 1, wherein the channel is in an unlicensed band.

17. The method of claim 10, wherein the channel is in an unlicensed band.

* * * * *